(12) United States Patent
Lane et al.

(10) Patent No.: US 7,403,470 B2
(45) Date of Patent: Jul. 22, 2008

(54) COMMUNICATIONS SYSTEM, METHODS AND APPARATUS

(75) Inventors: Frank A. Lane, Asbury, NJ (US); Rajiv Laroia, Basking Ridge, NJ (US); Junyi Li, Bedminster, NJ (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 11/184,051

(22) Filed: Jul. 18, 2005

(65) Prior Publication Data
US 2006/0285481 A1 Dec. 21, 2006

Related U.S. Application Data

(60) Provisional application No. 60/689,911, filed on Jun. 13, 2005.

(51) Int. Cl.
*H04J 11/00* (2006.01)
(52) U.S. Cl. .................. 370/203; 370/319; 370/328; 370/344
(58) Field of Classification Search .......... 370/203, 370/310, 316, 319, 344, 343, 480, 482, 328; 375/260
See application file for complete search history.

(56) References Cited

U.S. PATENT DOCUMENTS 6,272,315 B1 *  8/2001  Chang et al. ............... 455/13.1
2003/0081538 A1 *  5/2003  Walton et al. .............. 370/206
2004/0162097 A1 *  8/2004  Vijayan et al. ............. 455/522
2005/0041619 A1     2/2005  Karabinis et al.
2005/0135230 A1 *  6/2005  Yu et al. ..................... 370/210
2005/0286465 A1 * 12/2005  Zhuang ..................... 370/329
2006/0008028 A1 *  1/2006  Maltsev et al. ............. 375/297

OTHER PUBLICATIONS

International Search Report for PCT/US2006/022702, 3 pages, dated Oct. 16, 2006.
Written Opinion of the International Searching Authority for PCT/US2006/022702, 6 pages, dated Oct. 16, 2006.

* cited by examiner

*Primary Examiner*—Edan Orgad
*Assistant Examiner*—Jay P. Patel
(74) *Attorney, Agent, or Firm*—Straub & Pokotylo; Michael P. Straub; Ronald P. Straub

(57) ABSTRACT

An OFDM wireless communications system includes terrestrial and satellite based base stations. Mobile nodes support two uplink modes of operation, multi-tone mode for terrestrial station interaction and single tone mode for satellite base station interaction. In single tone mode the peak to average power ratio is lower than in the multi-tone mode allowing the same power amplifier to transmit higher average power signals and thus extend range and reach a satellite in geostationary orbit. In multi-tone mode, the mobile node: is temporarily assigned a multi-tone uplink traffic channel segment for user data, is assigned a dedicated control channel for uplink control signals, and supports slaved Ack/Nak for traffic channels. In single tone mode, the mobile node: is assigned a single logical uplink dedicated tone to use for transmitting both user data and control data, and does not use a slaved Ack/Nak mechanism for traffic channels.

53 Claims, 13 Drawing Sheets

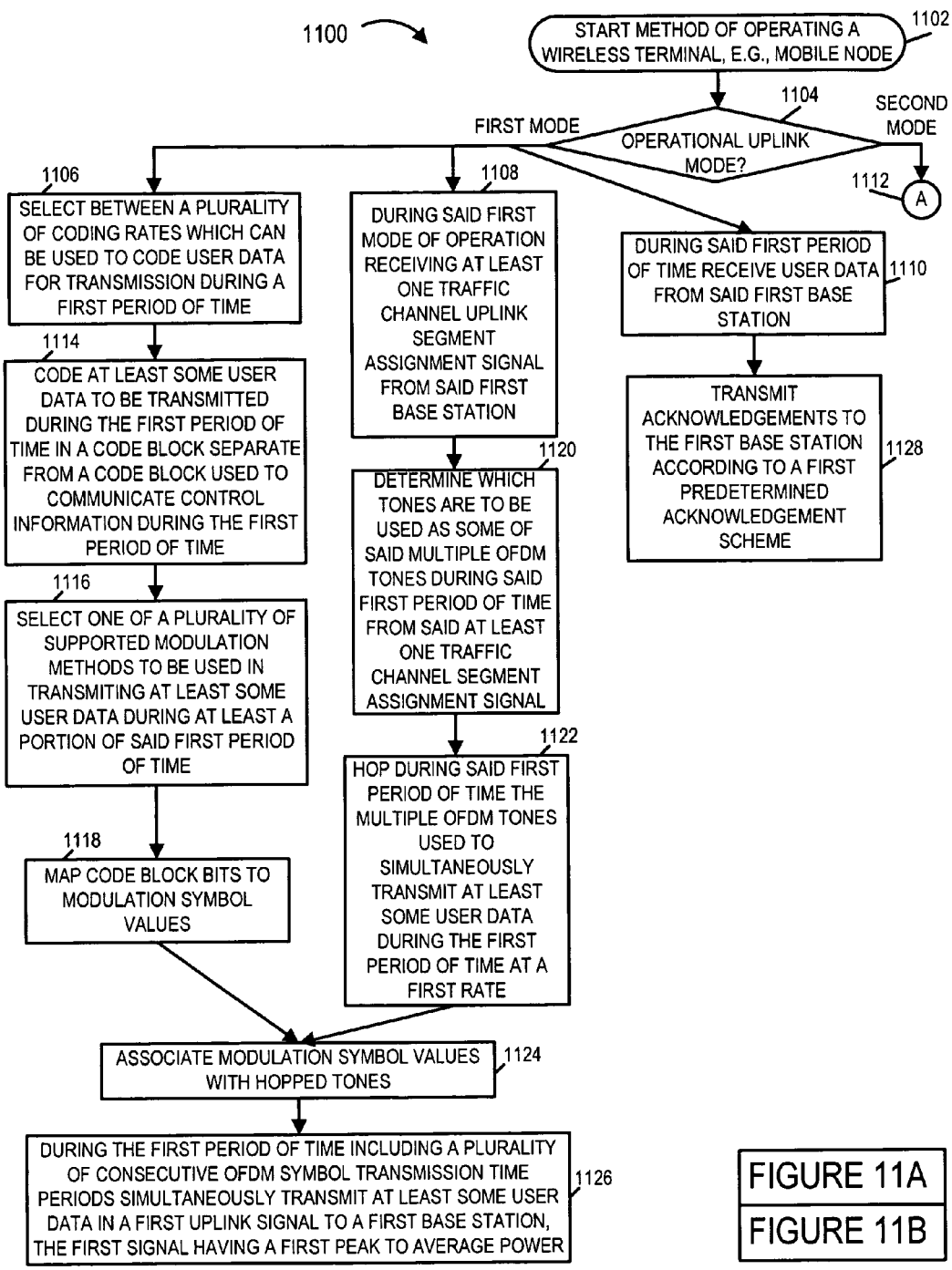

COMMUNICATIONS SYSTEM, METHODS AND APPARATUS

RELATED APPLICATIONS

The present application claims the benefit of U.S. Provisional Patent Application Ser. No. 60/689,911, filed on Jun. 13, 2005, titled "METHODS AND APPARATUS FOR IMPLEMENTING A HYBRID TERRESTRIAL/SATELLITE OFDM SYSTEM", which is hereby expressly incorporated by reference.

FIELD OF THE INVENTION

The present application is directed to methods and apparatus which can be used in implementing an OFDM system which uses OFDM tones for communicating uplink signals to terrestrial and/or satellite base stations.

BACKGROUND

The ability to communicate using a handheld communications device, e.g., a portable telephone, regardless of one's location in a wide area is of great value. The value of such a device is important to military applications as well as in the case of conventional consumer based applications.

Terrestrial base stations have been installed at various earth based locations to support voice and/or data services. Such base stations normally have a coverage area of a few miles at most. Accordingly, the distance between a conventional cell phone and a base station during use is normally only a few miles. Given the relatively small distance between a cell phone and a terrestrial base station during normal use, a hand held cell phone normally has sufficient power to transmit to the base station, e.g., on an uplink, using bandwidth that is relatively wide and, in many cases, capable of supporting relatively high data rates.

In the case of one known system based on the use of terrestrial base stations, a plurality of OFDM tones, e.g., in some cases 7 or more tones, are used in parallel by a wireless terminal to transmit user data to the base stations. In the known system, user data to be communicated via an uplink and control signals to be communicated via an uplink are normally coded separately. In the known system, a wireless terminal may be assigned a dedicated tone for uplink control signaling with uplink traffic segments which correspond to tones being assigned in response to one or more uplink requests transmitted to the terrestrial base station. In the known system uplink traffic channel segment assignment information is broadcast to the wireless terminals which monitor assignment signals that may indicate assignment of uplink traffic channel segments in response to a transmitted request. On a recurring basis, the base station of the known system also broadcasts signals which can be used for timing synchronization with the timing synchronization signals, referred to as beacon signals, recurring over a time period sometimes referred to as a beacon slot.

While terrestrial base stations are useful in areas where the population is sufficient to justify the cost of a terrestrial base station, in many locations on the planet there is insufficient commercial justification to deploy a base station and/or due to geographic issues it is impractical to deploy a permanent terrestrial base station. For example, in physically inhospitable areas such as the open ocean, dessert regions and/or regions which are covered by ice sheets it may be difficult or impractical to deploy and maintain a terrestrial base station.

The lack of base stations in some geographic regions leads to "dead zones" in which is not possible to communicate using a cell phone. In order to try and eliminate the number of areas where cell phone coverage is missing, companies are likely to continue to deploy new base stations but, for the reasons discussed above, for the foreseeable future there are likely to remain large areas of the planet where cell phone coverage from terrestrial base stations can not be obtained.

An alternative to terrestrial base stations is to use satellites as base stations. Satellite base stations are extremely costly to deploy given the cost of launching satellites. In addition, there is limited space above the planet in which geostationary satellites can be placed. While satellites in geostationary orbit have the advantage of being in a fixed position relative to the earth, lower earth orbiting satellites can also be deployed but such satellites remain costly to deploy and will remain in orbit for a shorter period of time due to their initially lower orbit than a geostationary satellite. The distance from the surface of the earth where a mobile phone may be located and geostationary orbit is considerable, e.g., approximately 22,226 miles although some estimates suggest that 22,300 miles is a better estimate. To put this in perspective, the diameter of the Earth is approximately 7,926 miles. Unfortunately, the distances which signals must travel in the case of satellite base stations is considerable longer than the distance signals normally travel to reach a conventional terrestrial base station which is usually a few miles at most.

As can be appreciated, given the distance to geostationary orbit, it is often necessary to transmit signals to satellites at higher power level than is required to transmit signals to terrestrial base stations. As a result, most satellite phones normally are relatively large and bulky compared to conventional cell phones due to the size of the batteries, power amplifiers and other circuitry which has been used to implement cell phones. The need for a relatively large, and therefore often bulky, power amplifier results, in part, from the fact that many conventional communications systems have a less than ideal peak to average power ratio. As is widely known, for a given signal, the peak to average power ratio is the ratio of the peak power over a time interval and the average power of the signal over the same time interval. The relatively large peak to average power ratio requires that a larger amplifier be included to support peak power output than could be used in the case of the same average power output, but where the peak to average power ratio is lower.

Given that terrestrial base station coverage is likely to remain limited in terms of geographic area which is covered for the foreseeable future, it would be desirable if methods and systems could be developed to provide the area coverage benefits of satellite base stations without requiring large bulky phones and/or the need for the system to be implemented completely as a satellite system. In particular, it would be desirable if methods and apparatus could be developed which would allow for communications devices, such as mobile phones, to be the same or approximately the same size as convention communications devices which are designed to operate solely with terrestrial base stations but which could operate with a satellite base station when terrestrial base station coverage is not available.

SUMMARY OF THE PRESENT INVENTION

The present invention is directed to communications methods and apparatus which are suitable for use in a communications system including both relatively near base stations and remote base stations.

For geo-stationary satellites with a beam covering a large geographical area there may be a significant difference in the round trip time between the center of the beam and the edge. To resolve this RTT ambiguity a ranging scheme capable of resolving delta-RTT of several milliseconds may be desirable.

Such a scheme can use the existing access interval in OFDM with additional time varying coding on the access tone set to indicate which forward link super slot the revere-link transmission is associated with. This coding can resolve ambiguity to the super slot level. The terminal may need to try repeated access attempts at varying time offsets to cover the sub-superslot (<11.4 msec) ambiguity. For a hybrid terrestrial-satellite network the terminal can use information about the position of the last terrestrial base station detected to form an initial RTT estimate and compress the ambiguity to within the range supported by the normal access protocol.

In some embodiments, the system of the present invention is implemented as a hybrid system where both satellite and terrestrial base stations are used in combination and where mobiles can establish communications links with either type of base station. To do this two different modes of timing synchronization are supported in a WT. In one mode used for remote base stations, e.g., satellite base stations, multiple access probe signals are sent with different coding and/or timing offsets with respect to signals received from the base station, e.g., beacon signals or other high power signals which can be used for timing synchronization purposes. The remote base station accepts and decodes probe signals received within an access interval that occurs on a recurring basis and responds assuming it is able to receive and decode the probe signal. The response may include a base station assigned wireless terminal identifier and timing synchronization information, e.g., a timing correction value. The response may also indicate which particular probe is being responded to. The WT monitors for response to probes and bases timing correction operations on the received response.

While not necessary to the timing features of the invention, the timing methods and apparatus can be used with single tone modes of operation where a single tone is used for uplink signaling to remote base stations.

In various embodiments a remote base station is a base station which has a minimum distance from a wireless terminal during use which is measured in terms of tens, hundreds or even thousands of miles. A geostationary satellite base station is one example of a remote base station. Geostationary satellite base stations are positioned thousands of miles above the earth's surface in which case the minimum distance to a communications device on the earth's surface or even in a commercial airplane is measured in thousands of miles. This is in contrast to a near base station which might be a terrestrial base station located within, e.g., up to 50 miles of a wireless terminal during normal use but more typically up to 5 miles.

While the methods and apparatus of the present invention, including the cell phones of the present invention are well suited for use in communications systems which have both terrestrial and satellite base stations, the methods and apparatus of the present invention are well suited for a wide range of communications applications where a large difference in the amount of output power for a fixed amount of bandwidth is required. In the satellite example, it should be appreciated that a far greater amount of output power for a fixed amount of bandwidth is normally required for successful uplink signaling to the satellite base station than is required for successful uplink signaling using the same amount of transmission bandwidth to a terrestrial base station.

Various features of the present invention are directed to methods and apparatus which can be used to implement portable communications devices capable of communicating with both remote and comparatively near base stations, e.g., satellite base stations and terrestrial base stations. A system implemented in accordance with the invention may include a plurality of near and remote base stations. In one such system, terrestrial base stations are used to provide communications coverage with sufficient communications traffic to justify the deployment of a terrestrial base station. Satellite base stations are used to provide fill in coverage in regions where terrestrial base stations are not deployed, e.g., due to the nature of the physical environment, the lack of a site for a base station or for other reasons. Portable communications devices in the exemplary system are capable of communicating with both the terrestrial and satellite base stations, e.g., by switching between different modes of operation.

As will be discussed below, in various embodiments, the system is implemented as an OFDM system. In some embodiments, OFDM signaling is used for uplink as well as downlink signaling. First and second modes of OFDM uplink operation are supported.

During normal operation with terrestrial base stations, the wireless terminal uses multiple tones in parallel in the uplink to transmit user data on multiple tones to a base station simultaneously. This allows relatively high data rates to be supported. When operating in multi-tone mode, the average peak to average power ratio, during portions of time in which user data is transmitted on multiple tones, is a first ratio. As will be discussed below, when operating in a single tone mode of operation, e.g., used for communicating with a satellite base station, a second, lower peak to average power ratio is achieved. Thus, when operating in the single tone mode, the power amplifier can be used in a more efficient manner. In various embodiments, the difference is 4 or more db, and commonly 6 db, in the peak to average power ratio between the multi-tone mode of operation and the single tone mode of operation which is achieved for a period of several symbol times.

Single-tone-mode is a method of operating an OFDM wireless terminal to maximize its coverage range under typical transmission power budget constraints encountered when communicating with terrestrial base stations so that satellite communications can be supported while staying within the typical terrestrial transmission power budget constraints. This mode is well suited for low rate data of voice links in which multi-tone uplink channels and ACKs may not be, and in some embodiments are not, supported. In single tone mode the terminal will transmit on an OFDM single tone at a time. This tone is represented as a single, constant logical tone; however, it can, and in various embodiments does, hop from physical tone to physical tone on dwell boundaries as consistent with other OFDM channels used in some systems. In one embodiment, this logical tone replaces a UL-DCCH channel used to communicate with a terrestrial base station thus maintaining compatibility with other OFDM users operating in standard multi-tone mode.

The contents of the single tone uplink channel used by a wireless terminal include, in some embodiments, a multiplex of control data and user data. This multiplex may be at the field level within a code word, i.e., some bits from a channel coding block are used to represent control data the remainder represent user data. However in other embodiments the multiplexing in the single tone uplink channel is at the code word level, e.g., control data is coded within a channel coding block, user data is coded within a channel coding block, and the blocks are multiplexed together for transmission in the single tone uplink channel. In one embodiment, when the single tone channel is not fully occupied with user data (e.g., during silence suppression of a voice call) it is possible to blank the transmitter during the un-need transmit symbols thereby conserving transmitter power since no signals need be sent during this period. User data may be multiplexed packet data or regularly scheduled voice data, or a mix of the two.

For a terminal operating in single-tone mode, downlink acknowledgement signals can not be transmitted in a separate channel as is done in the multi-tone mode and thus downlink acknowledgements are either multiplexed into the logical single tone uplink channel tone, or ACKs are not used. In such a case, the base station may assume that downlink traffic channel segments have been successfully received with the wireless terminal expressly requesting retransmission if needed.

In accordance with the invention, a wireless terminal operating in single tone mode can achieve a benefit in transmitted power while using standard OFDM components to implement the transmitter. In standard mode, the average power transmitted is normally limited below the peak power capacity of the transmitter's power amp to allow for peak-to-average ratio (PAR), typically 9 dB, and avoid peak clipping which can cause excessive out-of-band emission. In single tone mode, in various embodiments, the PAR is limited to approximately 3 dB thus the average transmit power can be increased by almost 6 dB without increasing the probability of clipping.

At frequency hops (changes in the physical tone corresponding to the single logical tone which occur at dwell boundaries), the phase of the transmitted waveform can be controlled so as to be phase continuous across frequencies. This can, and is accomplished in some but not necessarily all embodiments by changing the carrier frequency of the tone during the cyclic extension of the OFDM symbol from one symbol transmitted in the uplink to the next so that the signal phase at the end of the symbol is at a desired value equal to the starting phase of the subsequent symbol. This phase continuous operation will allow the PAR of the signal to be bounded at 3 dB.

OFDM over geo-stationary satellite is possible with a few modifications of the basic existing basic OFDM communications protocols. Due to the extremely long round-trip time (RTT) there is little or no value of slaved acknowledgments for traffic channels. Thus, in some embodiments of the invention, when operating in single tone uplink mode, downlink acknowledgments are not sent. In some such embodiments, downlink acknowledgements are replaced with a repeat request mechanism in which a request is transmitted in the UL for a repeat transmission of the data which was not received successfully.

Numerous features, benefits and embodiments of the present invention are discussed in the detailed description which follows.

BRIEF DESCRIPTION OF THE FIGURES

FIG. 11 comprising the combination of FIG. 11A

DETAILED DESCRIPTION

Figure 1:
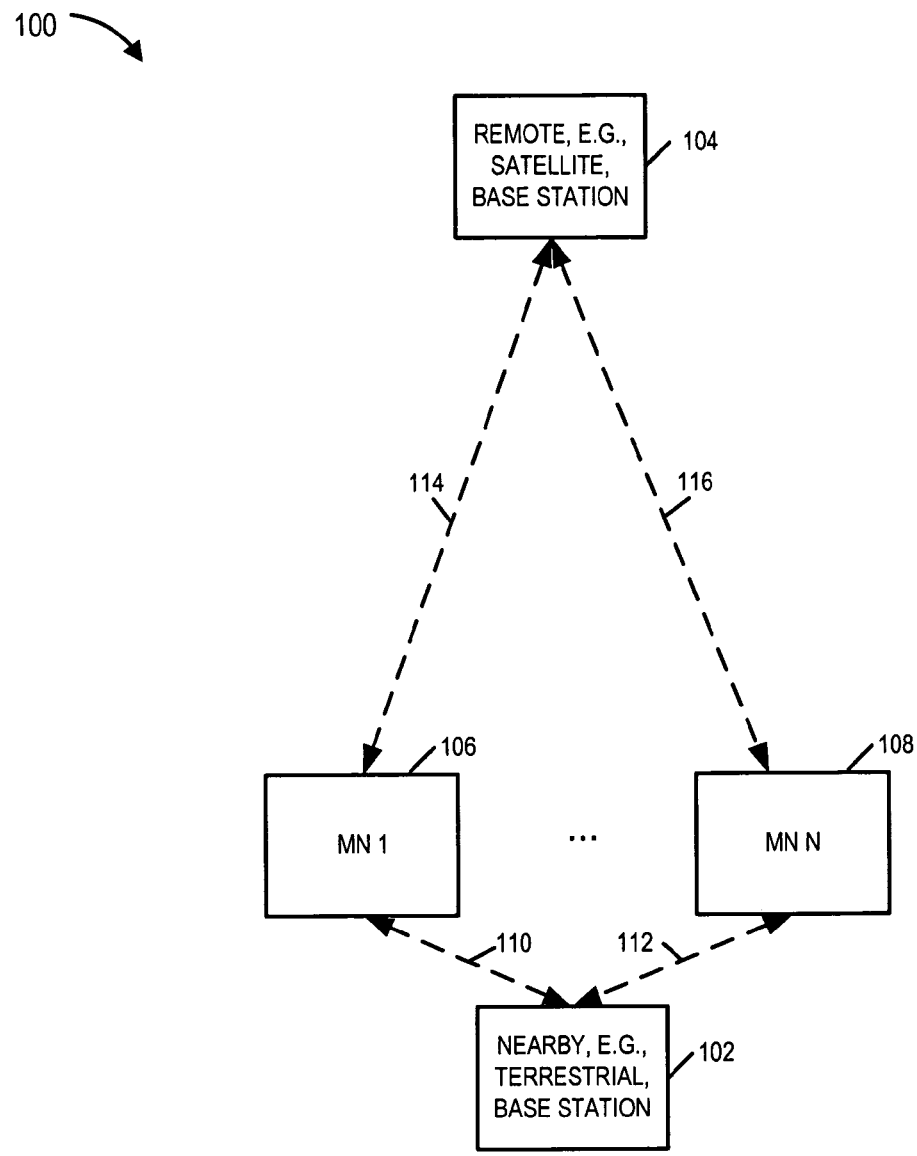
FIG. 1 is a drawing of an exemplary wireless communications system implemented in accordance with the present invention and using methods of the present invention.

FIG. 1 is a drawing of an exemplary wireless communications system 100 implemented in accordance with the present invention and using methods of the present invention. The exemplary system 100 is an exemplary Orthogonal Frequency Division Multiplexing (OFDM) multiple access spread spectrum wireless communications system. The exemplary system 100 includes a plurality of base stations (102, 104) and a plurality of wireless terminals (106, 108), e.g., mobile nodes. The various base stations (102, 104) may be coupled together via a backhaul network. The mobile nodes (MN1 106, MN N 108) may move throughout the system and use a base station, in whose coverage area it is currently located, as it point of network attachment. Some of the base stations are terrestrial based base stations, e.g., BS 102, and some of the base stations are satellite based base stations, e.g., BS 104. From the perspective of the MNs (106, 108), the terrestrial base stations are considered nearby base stations (102) while the satellite based base stations are considered remote base stations (104). The MNs (106, 108) include the capability to operate in two different modes of operation, e.g., an uplink multi-tone mode of operation tailored to the power and timing considerations of communicating with a nearby, e.g., terrestrial, base station 102 and an uplink single tone mode of operation tailored to the power and timing considerations of communicating with a remote, e.g., satellite, base station 104. At some times, MN1 106 may be coupled to the satellite BS 104 via wireless link 114 and may be operating in an uplink single tone mode of operation. At other times, MN1 106 may be coupled to the terrestrial base station 102 via wireless link 110 and may be operating in a more conventional multi-tone uplink mode of operation. Similarly, at some times, MN N 108 may be coupled to the satellite BS 104 via wireless link 116 and may be operating in an uplink single tone mode of operation. At other times, MN N 108 may be coupled to the terrestrial base station 102 via wireless link 112 and may be operating in a more conventional multi-tone uplink mode of operation.

Other MNs may exist in the system that support communications with one type of base station, e.g., a terrestrial base station 102, but do not support communications with the other type of base station, e.g., the satellite base station 104.

Figure 2:
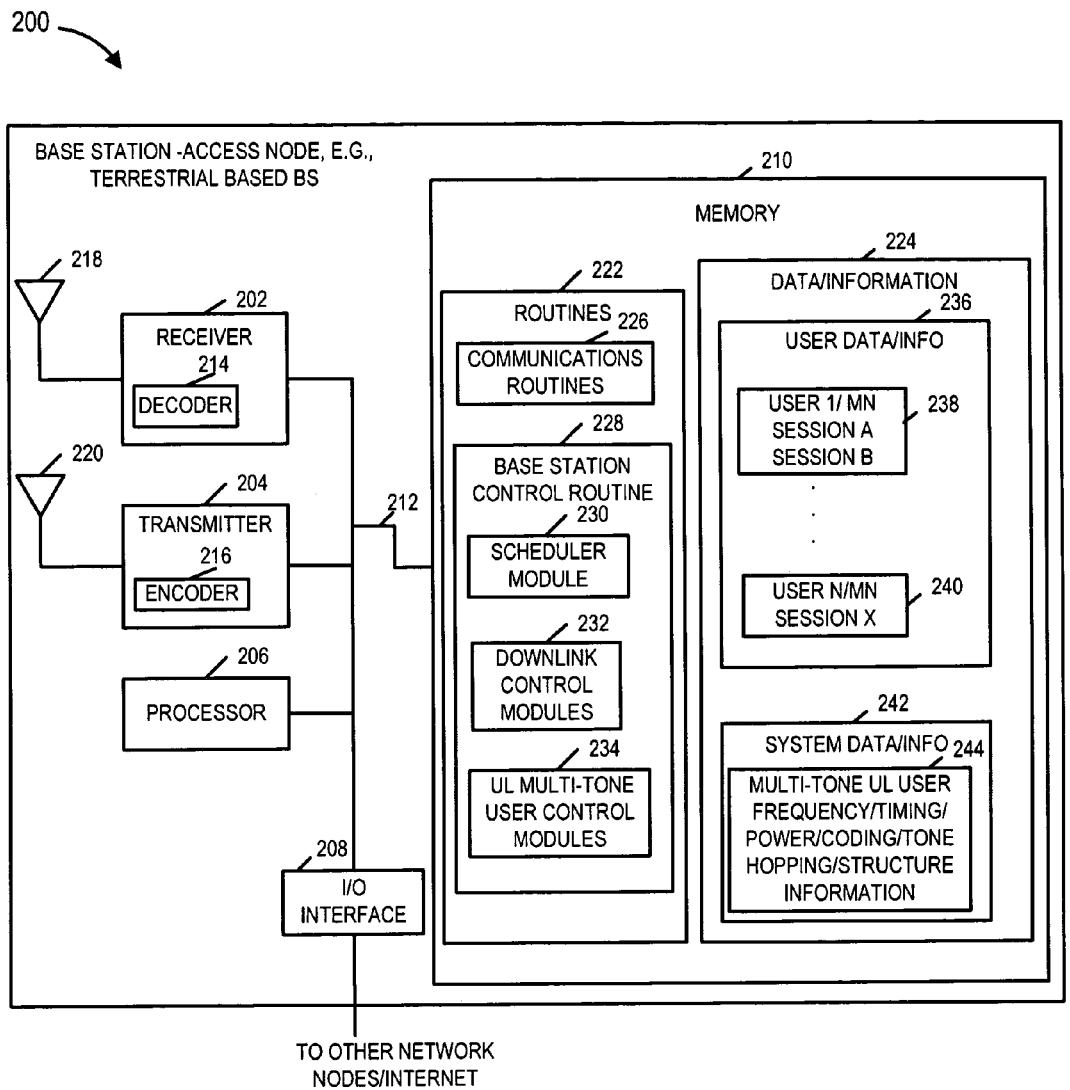
FIG. 2 is a drawing of an exemplary base station, e.g., a terrestrial based base station, implemented in accordance with the present invention and using methods of the present invention.

FIG. 2 is a drawing of an exemplary base station 200, e.g., a terrestrial based base station, implemented in accordance with the present invention and using methods of the present invention. Exemplary base station 200 may be the nearby, e.g., terrestrial, base station 102 of the exemplary system 100 of FIG. 1. The base station 200 is sometimes referred to an access node, as the base station 200 provides network access to WTs. The base station 200 includes a receiver 202, a transmitter 204, a processor 206, an I/O interface 208, and a memory 210 coupled together via a bus 212 over which the various elements may interchange data and information. The receiver 202 includes a decoder 214 for decoding received uplink signals from WTs. The transmitter 204 includes an encoder 216 for encoding downlink signals to be transmitted to WTs. The receiver 202 and transmitter 204 are each coupled to antennas (218, 220) over which uplink signals are received from WTs and downlink signals are transmitted to WTs, respectively. In some embodiments, the same antenna is used for receiver 202 and transmitter 204. The I/O interface 208 couples the base station 200 to the Internet/other network nodes. The memory 210 includes routines 222 and data/information 224. The processor 206, e.g., a CPU, executes the routines 222 and uses the data/information 224 in memory 210 to control the operation of the base station 200 and implement the methods of the present invention. Routines 222 include a communications routine 226 and base station control routine 228. The communications routine 226 implements the various communications protocols used by the base station 200. The base station control routine 228 includes a scheduler module 230, which assigns uplink and downlink segments to WTs including uplink traffic channel segments, downlink control modules 232 and uplink multi-tone user control modules 234. Downlink control module 232 controls downlink signaling to WTs including beacon signaling, pilot signaling, assignment signaling, downlink traffic channel segment signaling, and automatic retransmission mechanisms regarding downlink traffic channel segments in accordance with acks/naks received. Uplink multi-tone user control modules 234 control operations related to a WT operating in multi-tone uplink mode, e.g., access operations, operations of receiving and processing uplink traffic channel user data from a WT communicated over multiple, e.g., 7, tones simultaneously in an assigned uplink traffic channel segment, with assignment changing between different WTs over time, timing synchronization operations, and processing of control information from a WT communicated over a dedicated control channel using a dedicated logical tone.

Data/information 224 includes user data/information 236 which includes a plurality of sets of information (user 1/MN session A session B data/information 238, user N/MN session X data/information 240) corresponding to the wireless terminals using the base station 200 as their point of network attachment. Such WT user data/information may include, e.g., WT identifiers, routing information, segment assignment information, user data/information, e.g., voice information, data packets of text, video, music, etc., coded blocks of information. Data/information 224 also includes system information 242 including multi-tone UL user frequency/timing/power/tone hopping/coding structure information 244.

Figure 2A:
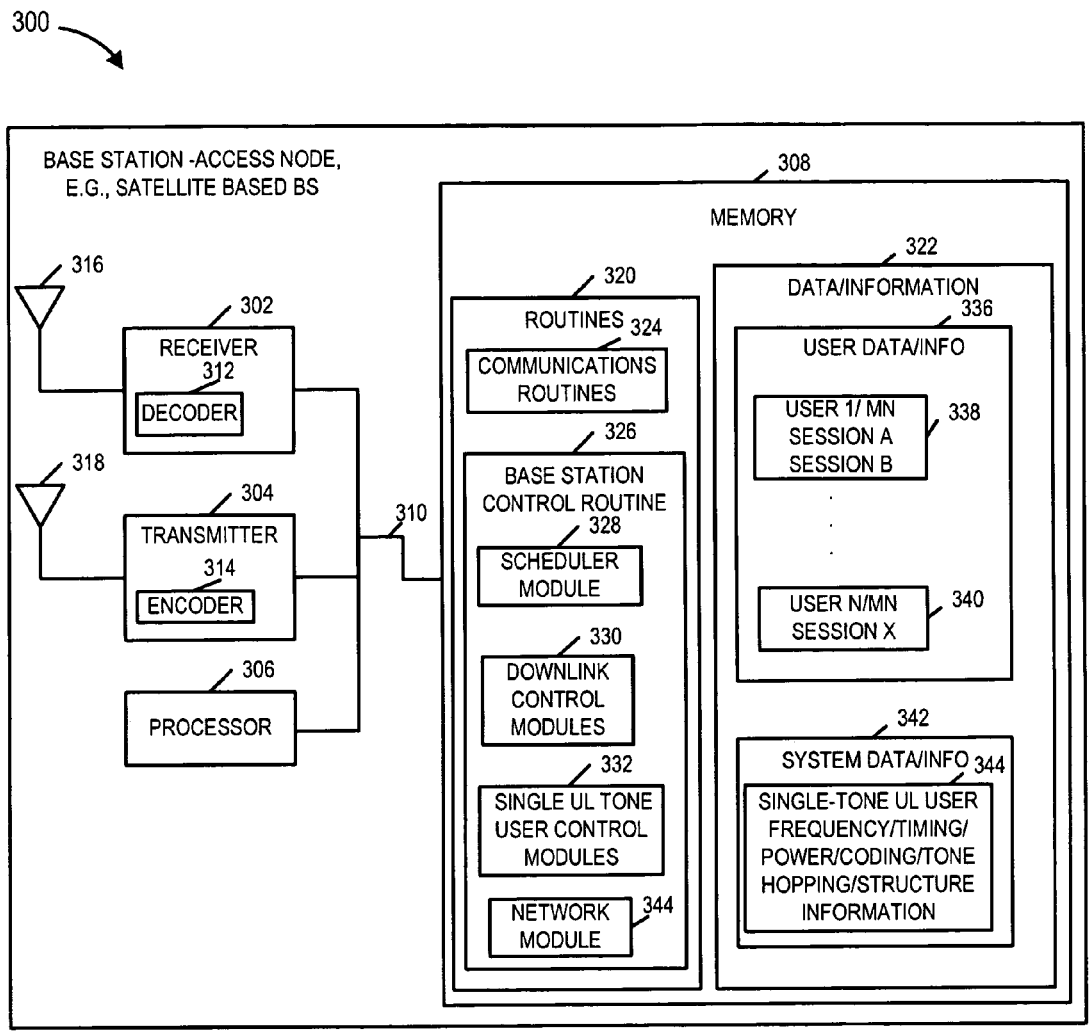
FIG. 2A is a drawing of an exemplary base station, e.g., a satellite based base station, implemented in accordance with the present invention and using methods of the present invention.

FIG. 2A is a drawing of an exemplary base station 300, e.g., a satellite based base station, implemented in accordance with the present invention and using methods of the present invention. Exemplary base station 300 may be BS 104 of exemplary system 100 of FIG. 1. The base station 300 is sometimes referred to an access node, as the base station provides network access to WTs. The base station 300 includes a receiver 302, a transmitter 304, a processor 306, and a memory 308 coupled together via a bus 310 over which the various elements may interchange data and information. The receiver 302 includes a decoder 312 for decoding received uplink signals from WTs. The transmitter 304 includes an encoder 314 for encoding downlink signals to be transmitted to WTs. The receiver 302 and transmitter 304 are each coupled to antennas (316, 318) over which uplink signals are received from WTs and downlink signals are transmitted to WTs, respectively. In some embodiments, the same antenna is used for the receiver 302 and transmitter 304. In addition to communicating with WTs, the base station 300 can communicate with other network nodes, e.g., a ground station with a directional antenna and high capacity link, the ground station coupled to other network nodes, e.g., other base stations, routers, AAA servers, home agent nodes and the Internet. In some embodiments, the same receivers 302, transmitters 304, and/or antennas previously described with BS—WT communication links are used for BS—network node ground station links, while in other embodiments separate elements are used for different functions. The memory 308 includes routines 320 and data/information 322. The processor 306, e.g., a CPU, executes the routines 320 and uses the data/information 322 in memory 308 to control the operation of the base station 300 and implement the methods of the present invention. The memory 308 includes a communications routine 324 and base station control routine 326. The communications routine 324 implements the various communications protocols used by the base station 300. The base station control routine 326 includes a scheduler module 328, which assigns downlink segments to WTs and reschedules downlink segments to WTs in response to received requests for retransmission, downlink control modules 330, single uplink tone user control modules 332, and network module 344. Downlink control module 330 controls downlink signaling to WTs including beacon signaling, pilot signaling, downlink segment assignment signaling, and downlink traffic channel segment signaling. The single UL tone user control modules 332 perform operations including: assigning a single dedicated logical tone to a WT user to be used for uplink signaling including both user data and control information and timing synchronization operations with a WT seeking to use the BS as its point of network attachment. Network module 334 controls operations related to the I/O interface with the network node ground station link.

Data/information 322 includes user data/information 336 which includes a plurality of sets of information (user 1/MN session A session B data/information 338, user N/MN session X data/information 340) corresponding the wireless terminals using the base station 300 as their point of network attachment. Such WT information may include, e.g., WT identifiers, routing information, assigned uplink single logical tone, downlink segment assignment information, user data/information, e.g., voice information, data packets of text, video, music, etc., coded blocks of information. Data/information 322 also includes system information 342 including single-tone UL user frequency/timing/power/tone hopping/coding structure information 344.

Figure 3:
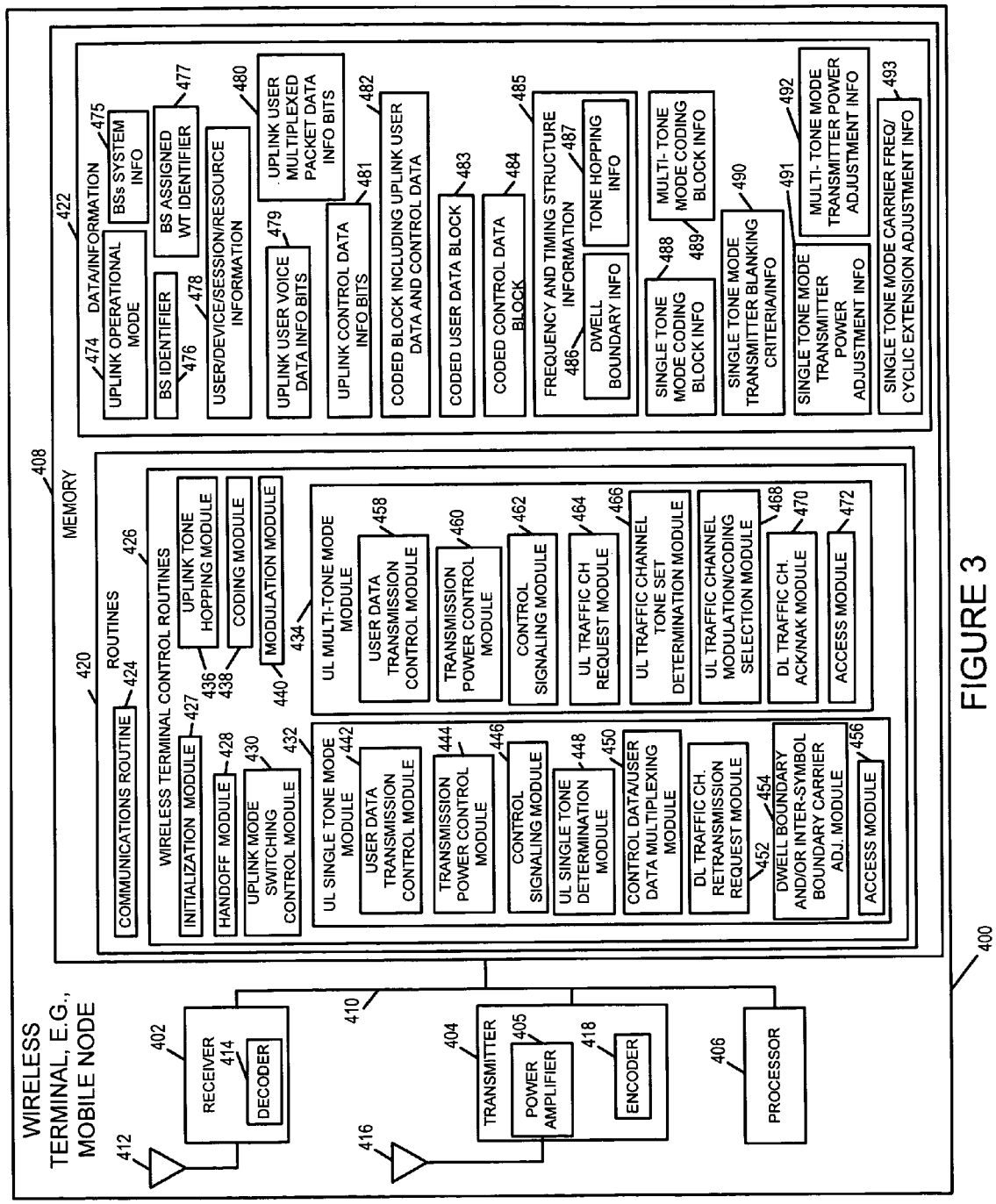
FIG. 3 is a drawing of an exemplary wireless terminal, e.g., mobile node, implemented in accordance in the present invention and using methods of the present invention.

FIG. 3 is a drawing of an exemplary wireless terminal 400, e.g., mobile node, implemented in accordance in the present invention and using methods of the present invention. Exemplary WT 400 may be any of the MNs 106, 108 of the exemplary system 100 of FIG. 1. The exemplary wireless terminal 400 includes a receiver 402, a transmitter 404, a processor 406, and memory 408 coupled together via a bus 410 over which the various elements may interchange data/information. The receiver 402, coupled to a receive antenna 412, includes a decoder 414 for decoding downlink signals received from BSs. The transmitter 404 coupled, to a transmit antenna 416, includes an encoder 418 for encoding uplink signals being transmitted to BSs. In some embodiments, the same antenna is used for the receiver 402 and transmitter 404. In some embodiments, an omni-directional antenna is used.

The transmitter 404 also includes a power amplifier 405. The same power amplifier 405 is used by the WT 400 for both the multi-tone uplink mode of operation and the single tone uplink mode of operation. For example, in the multi-mode uplink operational mode, where the uplink traffic channel segments may typically use 7, 14, or 28 tones simultaneously, the power amplifier needs to accommodate peak conditions where the 28 signals corresponding to the 28 tones simultaneously constructively align, this tends to limit the average output level. However, when the WT 400 is operated in a single uplink tone mode of operation, using the same power amplifier, the concern constructive alignment between signals from different tones is not an issue, and the average power output level for the amplifier can be considerably increased over the multi-tone operational mode. This approach, in accordance with the present invention, allows for a conventional terrestrial mobile node, to be adapted, with minor modifications, and used to communicate uplink signals to a satellite base station at a substantially increased distance.

The memory 408 includes routines 420 and data/information 422. The processor 406, e.g., a CPU, executes the routines 420 and uses the data/information 422 in memory 408 to control the operation of the wireless terminal 400 and implement the methods of the present invention. The routines 420 include a communications routine 424 and wireless terminal control routines 426. The communications routine 424 implements the various communications protocols used by the wireless terminal 400. The wireless terminal control routines 426 include an initialization module 427, a handoff module 428, an uplink mode switching control module 430, uplink single tone mode module 432, uplink multi-tone mode module 434, an uplink tone hopping module 436, a coding module 438, and a modulation module 440.

The initialization module 427 controls operations regarding start-up of the wireless terminal, e.g., including start-up from a power off to a power on state of operation, and operations related to the wireless terminal 400 seeking to establish a wireless communications link with a base station. The handoff module 428 controls operations related to handoffs form one base station to another, e.g., the WT 400 may be currently connected with a terrestrial base station, but be involved in a handoff to a satellite base station. Uplink switching control module 430 controls switching between different modes of operation, e.g., switching from a multi-tone uplink mode of operation to a single tone uplink mode of operation when the wireless terminal switches from communicating with a terrestrial base station to a satellite base station. Uplink single tone mode module 432 includes modules used in the single tone mode of operation with satellite base stations, while UL multi-tone mode module 434 includes modules used in the multi-tone mode of operation with terrestrial base stations.

Uplink single tone mode module 432 includes a user data transmission control module 442, a transmission power control module 444, a control signaling module 446, a UL single tone determination module 448, a control data/user data multiplexing module 450, a DL traffic channel retransmission request module 452, a dwell boundary and/or inter-symbol boundary carrier adjustment module 454, and an access module 456. The user data transmission module 442 controls operations related to uplink user data while in the single tone mode of operation. The transmission power control module 444 controls the transmission of power during the single tone uplink mode to maintain an average peak to average power ratio which is at least 4 dB lower than a peak to average power ratio maintained during said multi-tone uplink mode of operation. The control signaling module 446 controls signaling during the single tone mode of operation, and such control operations include reducing the frequency and/or number of the uplink control signals which are transmitted from the WT 400 when operation switches from the multi-tone mode of operation to the single tone mode of operation. The uplink single tone determination module 448 determines the single logical tone in the uplink timing structure which has been assigned to the WT to be used for uplink signaling, e.g., via an association with a base station assigned WT identifier. The control data/user data multiplexing module 450 multiplexes user data information bits with control data bits providing a combined input that may be coded as a block. The downlink traffic channel retransmission request module 452 issues requests for retransmission of downlink traffic channel segment which were not successfully decoded, e.g., provided the WT deems the data would still be valid given the large delay involved due to the long round trip signaling time. Dwell boundary carrier adjustment module 454 slightly changes the carrier frequency of the tone during the cyclic extension of the OFDM symbol that terminates a dwell so that the signal phase at the end of the symbol is at a desired value equal to the starting phases of the subsequent symbol. In this way, in accordance with a feature of some embodiments of the present invention, at frequency hops, the phase of the transmitted waveform can be controlled to be phase continuous across frequencies. In some embodiments, the frequency adjustment is performed, e.g., as part of a multi-part cyclic prefix included in each of successive OFDM symbols, to provide continuity between successive uplink OFDM symbols transmitted by the WT over the uplink during the single UL tone mode of operation. This continuity between symbols of the signal is advantageous in maintaining peak power level control, which affects the level to which the power amplifier 405 can be driven while in the single tone mode of operation.

The access module 456 controls operations related to establishing a new wireless link with a satellite base station. Such operation may include, e.g., timing synchronization operations including access probe signaling in accordance with various features of some embodiments of the present invention. For geo-stationary satellites with a beam covering a large geographical area there may be significant differences in the round trip time between the center of the beam and the edge. To resolve this RTT ambiguity, a ranging scheme capable of resolving delta-RTT of several milliseconds is used. For example, the timing structure may be divided into different time segments, such as, e.g., superslots, where a superslot represents 114 successive OFDM symbol transmission time intervals, and different coding of the access probe signal may be used for different superslots. This can be used to allow timing ambiguity between the WT and satellite BS to be resolved to within a superslot. In addition, repeated access attempts at various time offsets can be attempted repeatedly to cover the superlot ambiguity, e.g., (<11.4 msec). In some embodiments, position about the last terrestrial BS detected can be used to form an initial round trip time estimate (WT-SAT BS-WT) and this estimate can compress the range used to within the range supported by access signaling typically used with terrestrial base stations.

The uplink multi-tone module 434 includes a user data transmission control module 458, a transmission power control module 460, a control signaling module 462, an uplink traffic channel request module 464, an uplink traffic channel tone set determination module 466, an uplink traffic channel modulation/coding selection module 468, a downlink traffic channel ack/nak module 470, and an access module 472. The user data transmission control module 458 includes operations including controlling transmission of uplink traffic channel segments assigned to the WT.

User data transmission control module 458 controls uplink transmission related operations of user data in the multi-tone mode of operation, wherein user data is communicated in an uplink traffic channel segment, temporarily assigned to the WT, and including signals to be transmitted using multiple tones simultaneously. Transmission power control module 460 controls uplink transmission power levels in the multi-tone mode of uplink operation, e.g., adjusting output power levels in accordance with received base station uplink power control signals and within the capabilities of the power amplifier, e.g., in terms of not exceeding peak power output capability of power amplifier. Control signaling module 462 controls power and timing control signaling operations while in the multi-tone uplink mode of operation, the rate of control signaling being higher than in the single-tone uplink mode of operation. In some embodiments, control signaling module 462 includes the use of a dedicated control channel logical tone dedicated to the WT by the BS, e.g., corresponding to a BS assigned WT identifier, for use in uplink control signaling. Control signaling module 462 may code control information for transmission in uplink control channel segments which do not include user data. UL traffic channel request module 464 generates requests for traffic channel segments to be assigned, e.g., when the WT 400 has user data to communicate on the uplink. UL traffic channel tone set determination module 466 determines the set of tones to use corresponding to an assigned uplink traffic channel segment. The set of tones includes multiple tones to be used simultaneously. In the multi-tone mode of operation, the logical tone set assigned to a WT for communicating uplink traffic channel user data at one time may differ from the logical tone set assigned to the WT for communicating uplink traffic channel user data at a different time, even though the WT may have been assigned the same WT identifier by the same BS. Module 466 can also use tone hopping information to determine the physical tones corresponding to the logical tones. UL traffic channel modulation/coding selection module 468 selects and implements the uplink coding rate and modulation method to be used for an uplink traffic channel segment. For example, in the UL multi-tone mode, the WT may support a plurality of user data rates implemented using different coding rates and/or different modulation methods, e.g., QPSK, QAM 16. DL traffic channel Ack/Nak module 470 controls Ack/Nak determination and response signaling of received downlink traffic channel segments, while in the uplink multi-tone mode of operation. For example, for each downlink traffic channel segment in the downlink timing structure, there may be a corresponding Ack/Nak uplink segment in the uplink timing structure for the UL multi-tone mode of operation, and the WT, if assigned the downlink traffic channel segment sends an Ack/Nak back to the BS conveying the result of the transmission, e.g., to be used in an automatic retransmission mechanism. Access module 472 controls access operations while in the multi-tone mode of operation, e.g., access operations to establish a wireless link with a nearby, e.g., terrestrial base station, and achieve timing synchronization. In some embodiments, the access module 472 for multi-tone mode has a lower level of complexity than the access module 456 for single-tone mode.

Data/information 422 includes uplink operational mode 474, base station identifier 476, base stations system information 475, base station assigned wireless terminal identifier 477, user/device/session/resource information 478, uplink user voice data information bits 479, uplink user multiplexed packet data information bits 480, uplink control data information bits 481, coded block including uplink user data and control data 482, coded user data block, coded control data block 484, frequency and timing structure information 485, single tone mode coding block information 488, multi-tone mode coding block information 489, single tone mode transmitter blanking criteria/information 490, single tone mode transmitter power adjustment information 491, multi-tone mode transmitter power adjustment information 492, and single tone mode carrier frequency/cyclic extension adjustment information 493. The uplink operational mode 474 includes information identifying whether the WT 400 is currently in the multi-tone uplink mode, e.g., for communications with a terrestrial base station or in the single-tone uplink mode, e.g., for communications with a satellite base station. BSs system information 475 includes information associated with each of the base stations in the system, e.g., type of base station satellite or terrestrial, carrier frequency or frequencies used by the base station, base station identifier information, sectors in the base station, timing and frequency uplink and downlink structures used by the base station, etc.

BS identifier 476 includes an identifier of the BS the WT 400 is using as its current point of network attachment, e.g., distinguishing the BS from other BSs in the overall system. BS assigned WT identifier 477 may be an identifier, e.g., a value in the range 0 . . . 31, assigned by the BS being used as the WTs point of network attachment. In the single tone—tone uplink mode of operation, the identifier 477 may be associated with a single dedicated logical tone in the uplink timing structure to be used by the WT for uplink signaling including both user data and control data. In the multi-tone uplink mode of operation, the identifier 477 may be associated with a logical tone in the uplink timing structure to be used by the WT for a dedicated control channel for uplink control data. The BS assigned WT identifier 477 may also be used by the BS when making segment assignments, e.g., of an uplink traffic channel segment in the multi-tone mode of uplink operation.

User/device session/resource information 478 includes user and device identification information, routing information, security information, ongoing session information, and air link resource information. Uplink user voice data information bits 479 include input user data corresponding to a voice call. Uplink user multiplexed packet data information bits 480 includes input user data, e.g., corresponding to text, video, music, a data file, etc. Uplink control data information bits 481 includes power and timing control information that the WT 400 desires to communicate to the BS. Coded block including uplink user data and control bits 482 is the coded output block corresponding to a mixture of user information bits 478 and/or 479 in combination with control information bits 481, which is formed in some embodiments during the UL single tone mode of operation. Coded user data block 483 is a coded block of user information bits 478 and/or 479, while coded control data block 484 is a coded block of control information bits 481. Data and control information are coded separately in the UL multi-tone mode of operation, and in some embodiments, of the UL single tone mode of operation. In some embodiments of the single-tone mode of operation where coding between uplink user data and uplink control data is separate, the ability to blank the transmitter, when there is no user data to communicate, is facilitated. Single tone mode transmitter blanking criteria/information 490 is used in the blanking decisions, e.g., applying no output transmitter power on the single uplink tone during some intervals dedicated to user data, where there is no data to communicate, e.g., due to a lull in an ongoing conversation. This approach of transmitter blanking results in power saving for the wireless terminal, an important considerations where the average power output is relatively high to facilitate communications with a satellite in geo-stationary orbit. In addition, levels of interference may be reduced.

Single tone mode coding block information 488 includes information identifying the coding rate and modulation method used for the uplink in the single tone mode of operation, e.g., a low coding rate using QPSK modulation, e.g., supporting at least 4.8 KBits/sec. Multi-tone mode coding block information 489 includes a plurality of different data rate options that are supported for uplink traffic channel segments in the uplink during the multi-tone mode of operation, e.g., various coding rates and modulation schemes including QAM4, e.g., QPSK, and QAM16, such as to support at least the same coding rate as in the single tone mode plus some additional higher data rates.

Frequency and timing structure information 485 includes dwell boundary information 486 and tone hopping information 487, corresponding to the BS being used as the point of network attachment. Frequency and timing structure information 485 also includes information identifying logical tones within the timing and frequency structure.

Single tone mode transmitter power adjustment information 491 and multi-tone mode power adjustment information 492 includes information such as peak power, average power, peak to average power ratio, maximum power levels, for operation and control of the power amplifier 405, when in the single tone mode and multi-tone mode of operation, respectively. Single tone mode carrier frequency cyclic extension adjustment information 493 includes information used by the dwell boundary and/or inter-symbol boundary carrier adjustment module 454 to implement continuity between signals at symbol boundaries in the uplink during the single tone mode of operation, e.g., especially during hops at a dwell boundary from one physical tone to another.

Figure 4:
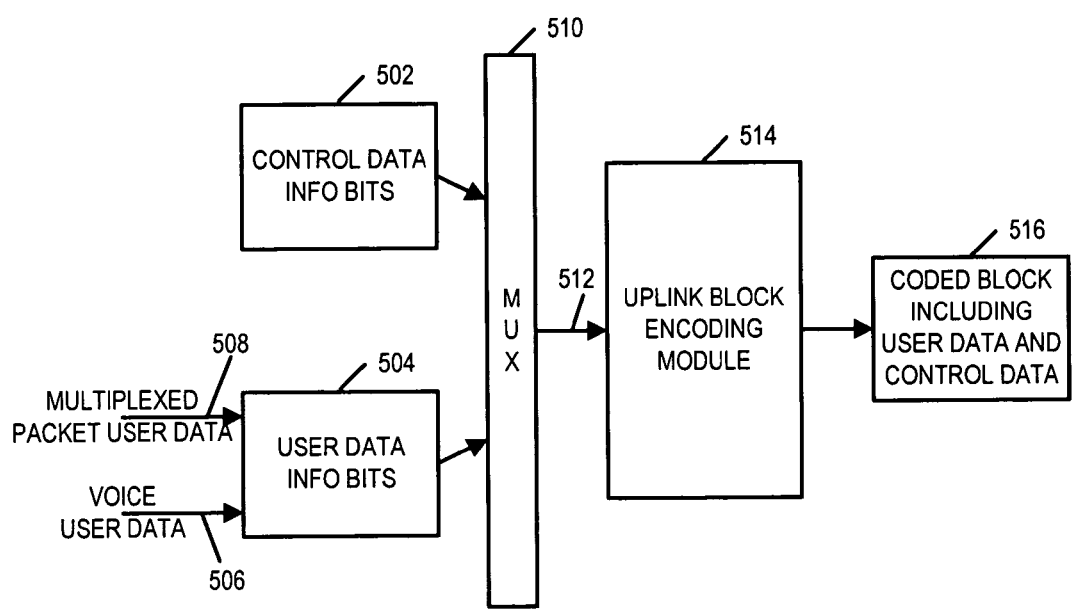
FIG. 4 is a drawing illustrating exemplary uplink information bit encoding for an exemplary WT, e.g., MN, operating in a single-tone uplink mode of operation, in accordance with various embodiments of the present invention.

FIG. 4 is a drawing 500 illustrating exemplary uplink information bit encoding for an exemplary WT, e.g., MN, operating in a single-tone uplink mode of operation, in accordance with various embodiments of the present invention. A logical tone, in the uplink frequency structure, is assigned directly or indirectly, e.g., by the base station, to the WT. For example, the BS may assign the single-tone mode WT a user identifier that may be associated with a specific dedicated logical tone. For example, the logical tone may be the same logical tone used as a dedicated control channel (DCCH) tone, if the WT is in a multi-tone mode of operation, e.g., where the WT normally communicates uplink traffic channel information using seven or more tones at the same time. The logical tone may be mapped to a physical tone in accordance with tone hopping information known to both the base station and the WT. Tone hopping between different physical tones may occur on dwell boundaries, where a dwell may be a fixed number, e.g., seven, of consecutive OFDM symbol transmission time intervals in a timing structure used in the uplink. The same logical tone in the uplink frequency structure is used in the single-tone mode of operation to convey both control information bits 502 and user data information bits 504. The control information bits 502 may include, e.g., power and timing control information. The user data bits 504 may include voice user data information bits 506 and/or multiplexed packet user data bits 508. A multiplexer 510 is used to receive the control data information bits 502 and the user data information bits 504. The output 512 of the multiplexer 510 is an input to an uplink block encoding module 514 which encodes the combination of control and user information bits and outputs a coded block of coded bits 516. The coded bits are mapped onto modulation symbols, in accordance with the uplink modulation scheme used, e.g., a low rate QSPK modulation scheme, and the modulation symbols are transmitted using the physical tone corresponding to the assigned logical tone. The uplink rate is such as to support at least one single voice call. In some embodiments, the uplink user information rate is at least 4.8 Kbits/sec.

Figure 5:
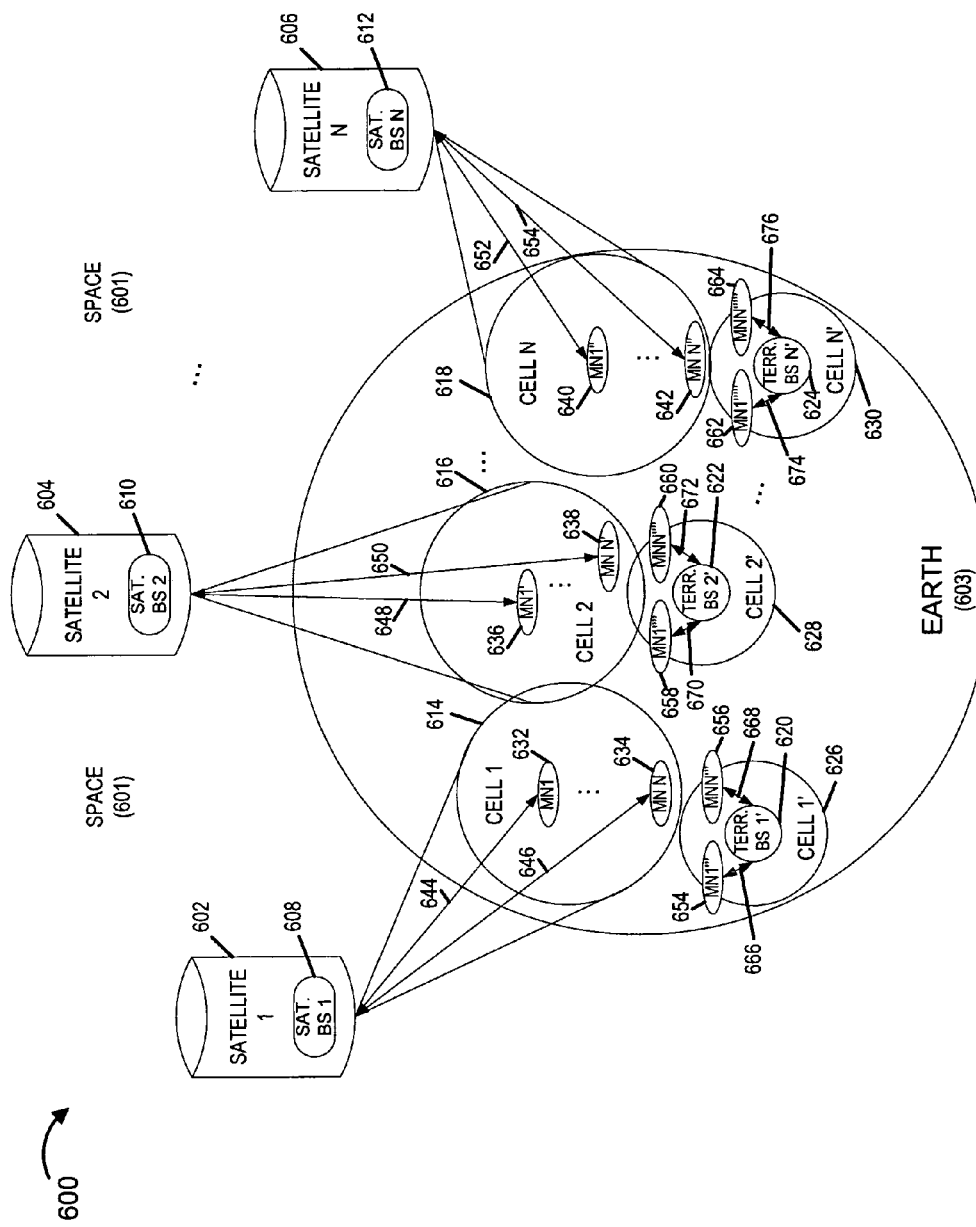
FIG. 5 is a drawing illustrating an exemplary OFDM wireless multiple access communications system including a hybrid of base stations that are both terrestrial based and space based, in accordance with various embodiments of the present invention.

FIG. 5 is a drawing illustrating an exemplary OFDM wireless multiple access communications system 600 including a hybrid of base stations that are both terrestrial based and space based, in accordance with various embodiments of the present invention. Each satellite (satellite 1 602, satellite 2 604, satellite N 606) includes a base station (satellite base station 1 608, satellite base station 2 610, satellite base station N 612), implemented in accordance with the present invention and using methods of the present invention. The satellites (602, 604, 608) may be, e.g., geo-stationary satellites, located in space 601 in a high earth orbit of approximately 22,300 mi around the equator of the earth 603. The satellites (602, 604, 606) may have corresponding cellular coverage areas on the surface of the earth (cell 1 614, cell 2 616, cell N 618), respectively. The exemplary hybrid communications system 600 also includes a plurality of terrestrial base station (terrestrial BS 1' 620, terrestrial BS 2' 622, terrestrial BS N' 624), each with a corresponding cellular coverage area (cell 1' 626, cell 2' 628, cell N' 630), respectively. Different cells or portions of different cell may or may not overlap with one another either partially or completely. Typically, the size of a terrestrial base stations cell is smaller than the size of a satellite's cell. Typically, the number of terrestrial base stations exceeds the number of satellite base stations. In some embodiments, many relatively small terrestrial BS cell are located within a satellites relatively large cell. For example, in some embodiments, terrestrial cells have a typical radius of 1–5 mi, while satellite cells typically have a radius of 100–500 mi. A plurality of wireless terminals, e.g., user communications devices such as cell phones, PDA, data terminals, etc., implemented in accordance with the present invention and using methods of the present invention exist in the system. The set of wireless terminals may include stationary nodes and mobile nodes; the mobile nodes may move throughout the system. A mobile node may use a base station, in whose cell it currently resides, as its point of network attachment. In some embodiments, the terrestrial BSs are used by the WTs as the default type of base station to first try to use in locations where access could be provided by either a terrestrial or satellite base station, with the satellite base stations being used primarily to provide access in those areas not covered by a terrestrial base station. For example, in some areas it may be impractical to install a terrestrial base station for economic, environmental, and/or terrain reasons, e.g., due to low population density, due to rugged inhospitable terrain, etc. In some terrestrial base station cells, there may be dead spots, e.g., due to obstructions such as mountains, high buildings, etc. In such dead spot locations satellite base stations could be used to fill in the gaps in coverage to provide the WT user with more seamless overall coverage. In addition, priority considerations, and user subscribed tier levels are used, in some embodiments, to determine access to satellite base stations. The base stations are coupled together, e.g., via a backhaul network, providing interconnectivity for the MNs located in different cells.

MNs communicating with a satellite base station may be operating in a single-tone mode of operation where a single tone is used for the uplink, e.g., supporting a voice channel. In the downlink, a larger set of tones may be used, e.g., 113 downlink tones, which are received and processed by the WT. For example, in the downlink the WT may be assigned temporarily, as needed, a downlink traffic channel segment using a plurality of tones simultaneously. In addition, the WT may receive control signaling simultaneously over different tones. Cell 1 614 includes (MN1 632, MN N 634) communicating with satellite BS 1 608 via wireless links (644, 646), respectively. Cell 2 616 includes (MN1' 636, MN N' 638) communicating with satellite BS 2 610 via wireless links (648, 650), respectively. Cell N 618 includes (MN1" 640, MN N" 642) communicating with satellite BS N 612 via wireless links (652, 654), respectively. In some embodiments, the downlink between the satellite BS and the MN supports a higher rate of user information than the corresponding uplink, e.g., supporting voice, data, and/or digital video broadcast in the downlink. In some embodiments, the downlink user data rate provided a WT, using a satellite BS as its point of network attachment, is approximately the same as the uplink user data rate, e.g., 4.8 Kbit/sec, thus supporting a single voice call, but tending to conserve power resources of the satellite base station.

MNs communicating with a terrestrial base stations may be operating in a conventional mode of operation, e.g., where multiple tones, e.g., seven or more, are used simultaneously for uplink traffic channel segments. Cell 1' 626 includes (MN1''' 654, MN N''' 656) communicating with terrestrial BS 1' 620 via wireless links (666, 668), respectively. Cell 2' 628 includes (MN1'''' 658, MN N'''' 660) communicating with terrestrial BS 2 622 via wireless links (670, 672), respectively. Cell N' 630 includes (MN1''''' 662, MN N''''' 664) communicating with terrestrial BS N' 624 via wireless links (674, 676), respectively.

Figure 6:
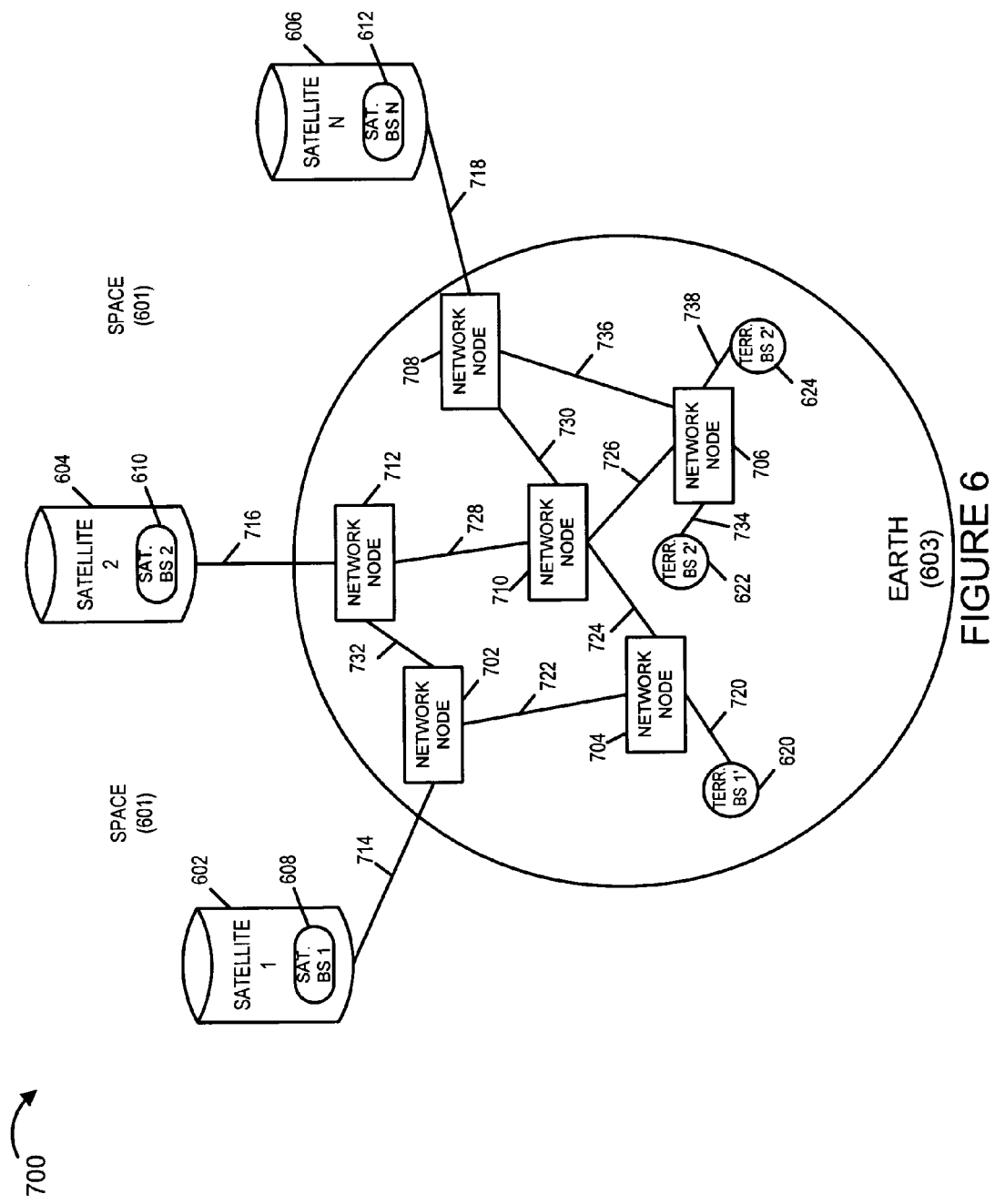
FIG. 6 is a drawing showing exemplary backhaul interconnectivity between the various satellite based and terrestrial based base stations of FIG. 5.

FIG. 6 is a drawing showing exemplary backhaul interconnectivity between the various satellite based and terrestrial based base stations of FIG. 5. Various network nodes (702, 704, 706, 708, 710, 712) may, include, e.g., routers, home agent nodes, foreign agent nodes, AAA server nodes, and satellite tracking/high communications data rate capacity ground stations for supporting and communicating with the satellites over the backhaul network. The links (714, 716, 718) between the network nodes (702, 716, 718) serving as ground stations and the satellite base stations (608, 610, 612) may be wireless links using directed antennas while, the links (720, 722, 724, 726, 728, 730, 732, 734, 736, 738) between the terrestrial nodes may be wire and/or wireless links, e.g., fiber optic cables, broadband cables, microwave links, etc.

Figure 7:
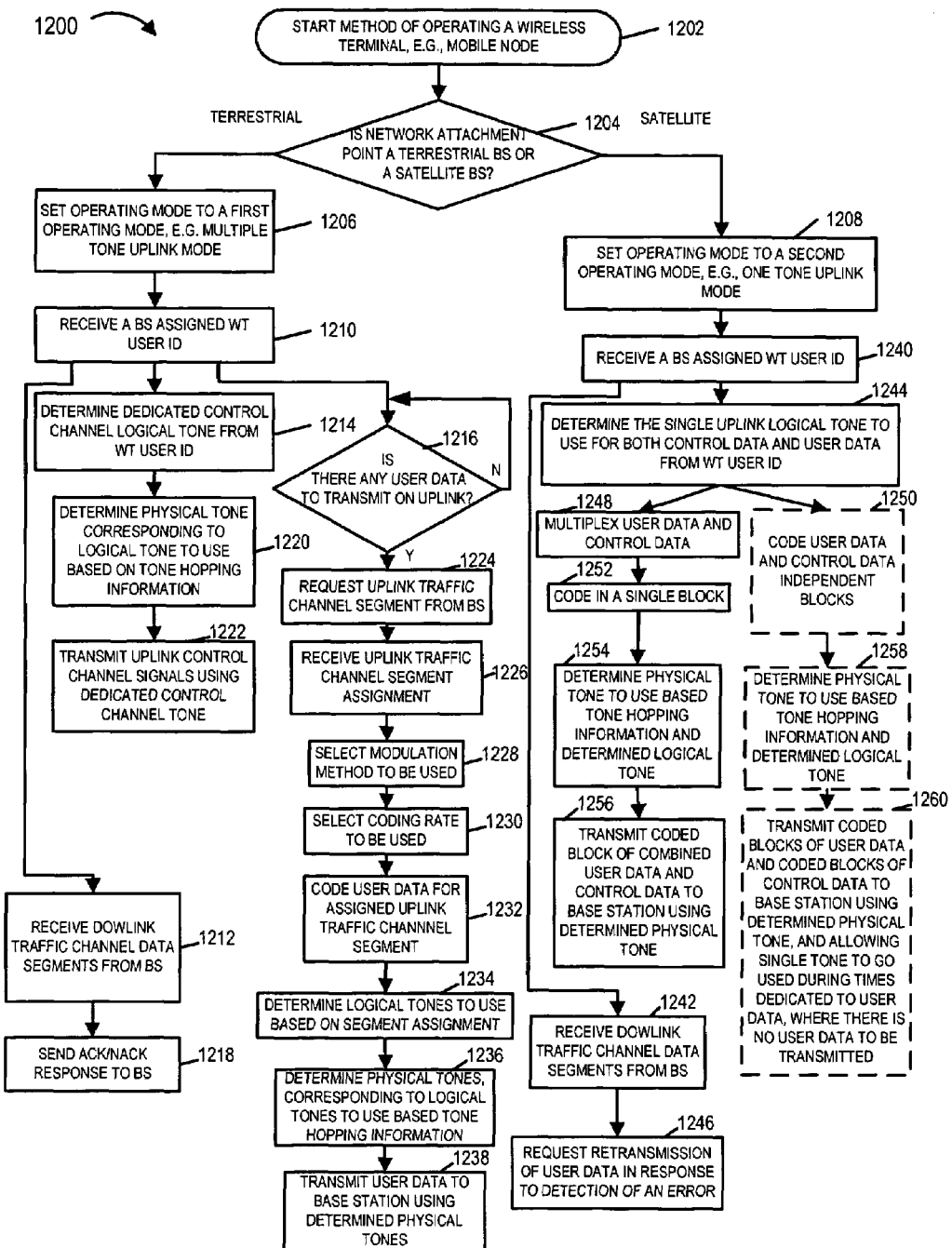
FIG. 7 is a flowchart of an exemplary method of operating a wireless terminal, e.g., mobile node, in accordance with the present invention.

FIG. 7 is a flowchart 1200 of an exemplary method of operating a wireless terminal, e.g., mobile node, in accordance with the present invention. The wireless terminal may be one of a plurality of first type wireless terminals in an exemplary wireless OFDM multiple access spread spectrum communications system including a plurality of base stations, some base stations being terrestrial based and some base stations being satellite based, said first type wireless terminals being capable of communicating with both terrestrial base stations and satellite base stations. The exemplary communications system may also include exemplary second type wireless terminals which can communicate with terrestrial base stations, but cannot communicate with satellite base stations.

Operation of the method of flowchart 1200 starts in step 1202 in response to a wireless terminal having powered on or in response to a handoff operation. Operation proceeds from start step 1202 to step 1204. In step 1204, the wireless terminal determines whether the network attachment point, that it intends to use as its new point of network attachment, is a terrestrial base station or a satellite base station. If it is determined in step 1204 that the new network attachment point is a terrestrial base station then operation proceeds to step 1206, where the wireless terminal sets its operating mode to a first operating mode, e.g., a multiple tone uplink mode of operation. However, if it is determined in step 1204 that the new network attachment point is a satellite base station, then operation proceeds to step 1208, where the wireless terminal sets its operating mode to a second operating mode, e.g., a one tone uplink mode of operation.

Returning to step 1206, operation proceeds from step 1206 to step 1210, where the WT having been accepted by the new terrestrial base station, receives a base station assigned wireless terminal user identifier. Operation proceeds from step 1210 to step 1212, 1214, and 1216. In step 1212, the WT is operated to receive signals corresponding to downlink traffic channel segments, conveying downlink user data, from the terrestrial base station. Operation proceeds from step 1212 to step 1218, where the WT sends an Acknowledgment/Negative Acknowledgment (Ack/Nak) response signal to the base station.

Returning to step 1214, in step 1214, the WT determines a dedicated control channel logical tone from the WT user ID received in step 1212. Operation proceeds from step 1214 to step 1220. In step 1220, the WT determines the physical tone corresponding to the logical tone to use based upon tone hopping information. For example, the WT assigned ID variable may have a range of 32 values (0 . . . 31), each ID corresponding to a different single logical tone in a uplink timing structure, e.g., an uplink timing structure including 113 tones. The 113 logical tones may be hopped in accordance with an uplink tone hopping pattern within the uplink timing structure. For example, excluding access intervals, the uplink timing structure may be subdivided into dwell intervals, each dwell interval having a duration of a fixed number, e.g., seven, successive OFDM symbol transmission time intervals, and tone hopping occurs at the dwell boundaries but not in-between. Operation proceeds from step 1220 to step 1222. In step 1222, the WT is operated to transmit uplink control channel signals using the dedicated control channel tone.

Returning to step 1216, in step 1216, the WT checks as to whether there is user data to transmit on the uplink. If there is no data waiting to be transmitted, operation proceeds back to step 1216, where the WT continues to check for data to transmit. However, if in step 1216, it is determined that there is user data to transmit on the uplink, then operation proceeds from step 1216 to step 1224. In step 1224, the WT requests an uplink traffic channel assignment from the terrestrial base station. Operation proceeds from step 1224 to step 1226. In step 1226, the WT receives an uplink traffic channel segment assignment. Operation proceeds to step 1228, where the WT selects a modulation method to use, e.g., QPSK or QAM16. In step 1230, the WT selects a coding rate to be used. Operation proceeds from step 1230 to step 1232, where the WT codes the user data for the assigned uplink traffic channel segment in accordance with the selected coding rate of step 1230 and maps the coded bits to modulation symbol values in accordance with the selected modulation method of step 1228. Operation proceeds from step 1232 to step 1234, where the WT determines the logical tones to use based on the uplink traffic channel segment assignment. In step 1236, the WT determines the physical tones, corresponding to the logical tones to use based on tone hopping information. Operation proceeds from step 1236 to step 1238. In step 1238, the WT transmits user data to the terrestrial base station using the determined physical tones.

Returning to step 1208, operation proceeds from step 1208 to step 1240. In step 1240, the WT, having been accepted by the satellite base station, receives a BS assigned WT user ID from the satellite base station. Operation proceeds from step 1240 to steps 1242 and step 1244.

In step 1242, the WT is operated to receive signals corresponding to downlink traffic channel segments, conveying downlink user data, from the satellite base station. Operation proceeds from step 1242 to step 1246, where the WT request retransmission of the downlink traffic channel user data in response to an error. If the downlink transmission was successfully received and decoded no response is communicated from the wireless terminal to the base station. In some embodiments, where an error is detected in the information recovery process, a request for retransmission is not sent, e.g., as the time window of validity for the lost downlink data will expire before a retransmission could be completed or due to a low priority level of the data.

Returning to step 1244, in step 1244, the WT determines the single uplink logical tone to use for both control data and user data for the assigned WT user ID. Operation proceeds to either step 1248 or step 1250, depending on the particular embodiment.

In step 1248, the WT multiplexes user data and control data to be communicated on the uplink. The multiplexed data of step 1248 is forwarded to step 1252, where the WT codes the mixture of user and control information bits into a single coded block. Operation proceeds from step 1252 to step 1254, where the WT determines the physical tone to use for each dwell based on the determined logical tone and tone hopping information. Operation proceeds from step 1254 to step 1256. In step 1256, the WT is operated to transmit the coded block of combined user data and control data to the satellite base station using the determined physical tone for each dwell.

In step 1250, the WT is operated to code the user data and control data in independent blocks. Operation proceeds from step 1250 to step 1258, where the WT is operated to determine the physical tone to be used for each dwell based on the determined logical tone and the tone hopping information. Operation proceeds from step 1258 to step 1260. In step 1260, the WT is operated to transmit coded blocks of user data and coded blocks of control data to the satellite base station using the determined physical tone, determined on a per dwell basis. With regard to step 1260, in accordance with a feature of some embodiments of the present invention, during time intervals dedicated to user data, where there is no user data to be transmitted, the single tone is allowed to go unused.

Operating a wireless terminal in accordance with the method of flowchart 1200 can result in operating the wireless terminal during a first period of time including a first plurality of consecutive OFDM symbol transmission time periods in the first mode of operation during which multiple OFDM tones are used simultaneously to transmit at least some user data in a first uplink signal having a first peak to average power ratio. For example, the WT may using a terrestrial base station as its point of network attachment and may be communicating uplink user data over air link resources corresponding to an uplink traffic channel segment using a plurality of tones simultaneously for uplink traffic channel data, e.g., 7, 14, or 28 tones; an additional tone or tones may also be used in parallel for control signaling, e.g., a dedicated control channel tone. Operating a wireless terminal in accordance with the method of flowchart 1200 can also result in operating the wireless terminal during a second period of time including a second plurality of consecutive OFDM symbol transmission time periods in the second mode of operation during which at most one OFDM tone is used to transmit at least some user data in a second uplink signal having a second peak to average power ratio, which is different from said first peak to average ratio. For example, during the second period of time, the WT may be using a satellite base station as its point of network attachment and may be communicating uplink user data and control data over air link resources corresponding to a single dedicated logical tone associated with a base station assigned WT user identifier, said single dedicated logical tone may be hopped to different physical tones on dwell boundaries.

In some embodiments, the second peak to average power ratio is lower than the first peak to average power ratio, e.g., by at least 4 dB. In some embodiments, the WT uses an omni-directional antenna. User data communicated over the uplink during the first mode of operation during the first period of time can include user data at a rate of at least 4.8 Kbits/sec. User data communicated over the uplink during the second mode of operation during the second period of time can include user data at a rate of at least 4.8 Kbits/sec. For example, a voice channel may be supported for WT operation in both the first and second modes of operation. In some embodiments, the WT supports a plurality of different uplink coding rate options in the first mode of operation including a plurality of different coding rates and a plurality of different modulation schemes, e.g., QPSK, QAM16. In some embodiments, the WT supports a single uplink rate option for operation in the second mode, e.g: QPSK using a single coding rate. In some embodiments, the information bit rate, regarding uplink user data signals, in the second mode of operation is less than or equal to the minimum information bit rate, regarding uplink user data signal, in the first mode of operation.

In some embodiments, the distance between the satellite base station and the wireless terminal, when said satellite base station is being used by the WT as its point of network attachment, is at least 3 times the distance between the terrestrial base station and the wireless terminal, when said terrestrial base station is being used by the WT as its point of network attachment. In some embodiments, at least some of the satellite base stations in the communications system are geo-stationary or geo-synchronous satellites. In some such embodiments, the distance between the geo-stationary or geo-synchronous satellite base station and the WT using it as its point of network attachment is at least 35,000 km, while the distance between a ground base station and the WT using it as its point of network attachment is at most 100 km. In some embodiments, the satellite base station being used by the WT as its point of network attachment is at least a distance away from the WT such that a signal round trip time exceeds 100 OFDM symbol transmission time period, each OFDM symbol transmission time period including an amount of time used to transmit one OFDM symbol and a corresponding cyclic prefix.

In some embodiments, switching from a first mode of operation to a second mode of operation occurs when a handoff occurs between a terrestrial base station and a satellite base station. In some such embodiments, wherein switching from the first mode of operation to the second mode of operation occurs, the WT ceases to send acknowledgment signals in response to received downlink user data. In some such embodiments, wherein switching from the first mode of operation to the second mode of operation occurs, the WT reduces the frequency and/or number of uplink control signals which are transmitted.

Other embodiments, in accordance with various features of the present invention, may include systems that include space based base stations but do not include terrestrial based base stations, systems that include terrestrial base stations but do not include space based base stations, and various combinations including airborne platform based base stations.

In systems such as the uplink system of the present invention, in addition to power issues, uplink symbol timing synchronization may be an issue in some but not necessarily all applications, e.g., applications in which there are multiple WTs which may transmit in an uplink to a satellite at the same time as occurs in a multi-user system. In OFDM, it is important that symbols transmitted by different WTs arrive at the base station at the same time. Various methods of achieving uplink timing synchronization may be used. At least some exemplary timing synchronization methods are described in U.S. Provisional Patent Application Ser. No. 60/689,910, filed on Jun. 13, 2005 titled "METHODS AND APPARATUS FOR SUPPORTING OFDM UPLINKS WITH REMOTE BASE STATIONS", and in U.S. utility Patent Application titled "METHODS AND APPARATUS FOR SUPPORTING UPLINKS WITH REMOTE BASE STATIONS", filed on the same date as the present application. Both of the preceding applications are hereby expressly incorporated by reference and which is being filed on the same date as this Provisional Patent application, and which names the same individuals as are named on the present application as inventors.

In various embodiments of the invention when communicating with remote base stations, some of which use multiple tones in an uplink, uplink segment assignments are used with the UL assignment slave structure being adjusted to account for assignment of traffic segments >2× the maximum RTT (round trip time). In some but not necessarily all cases of terminals without high gain antennas, e.g., handsets with omni-directional antennas or nearly omni-directional antennas, the extreme link budget requirements for successful receipt of a transmitted signal by a satellite base station may limit communication through the use of single one mode. Accordingly, in some embodiments when a handoff occurs from a terrestrial base station to a satellite base station, the wireless terminal detects the change and switches from multi-tone uplink mode to a single OFDM tone uplink mode operation.

For geo-stationary satellites with a beam covering a large geographical area there may be a significant difference in the round trip time between the center of the beam and the edge. To resolve this RTT ambiguity a ranging scheme capable of resolving delta-RTT of several milliseconds may be desirable.

Such a scheme can use the existing access interval in OFDM with additional time varying coding on the access tone set to indicate which forward link super slot the reverelink transmission is associated with. This coding can resolve ambiguity to the super slot level. The terminal may need to try repeated access attempts at varying time offsets to cover the sub-superslot (<11.4 msec) ambiguity. For a hybrid terrestrial-satellite network the terminal can use information about the position of the last terrestrial base station detected to form an initial RTT estimate and compress the ambiguity to within the range supported by the normal access protocol.

Figure 8:
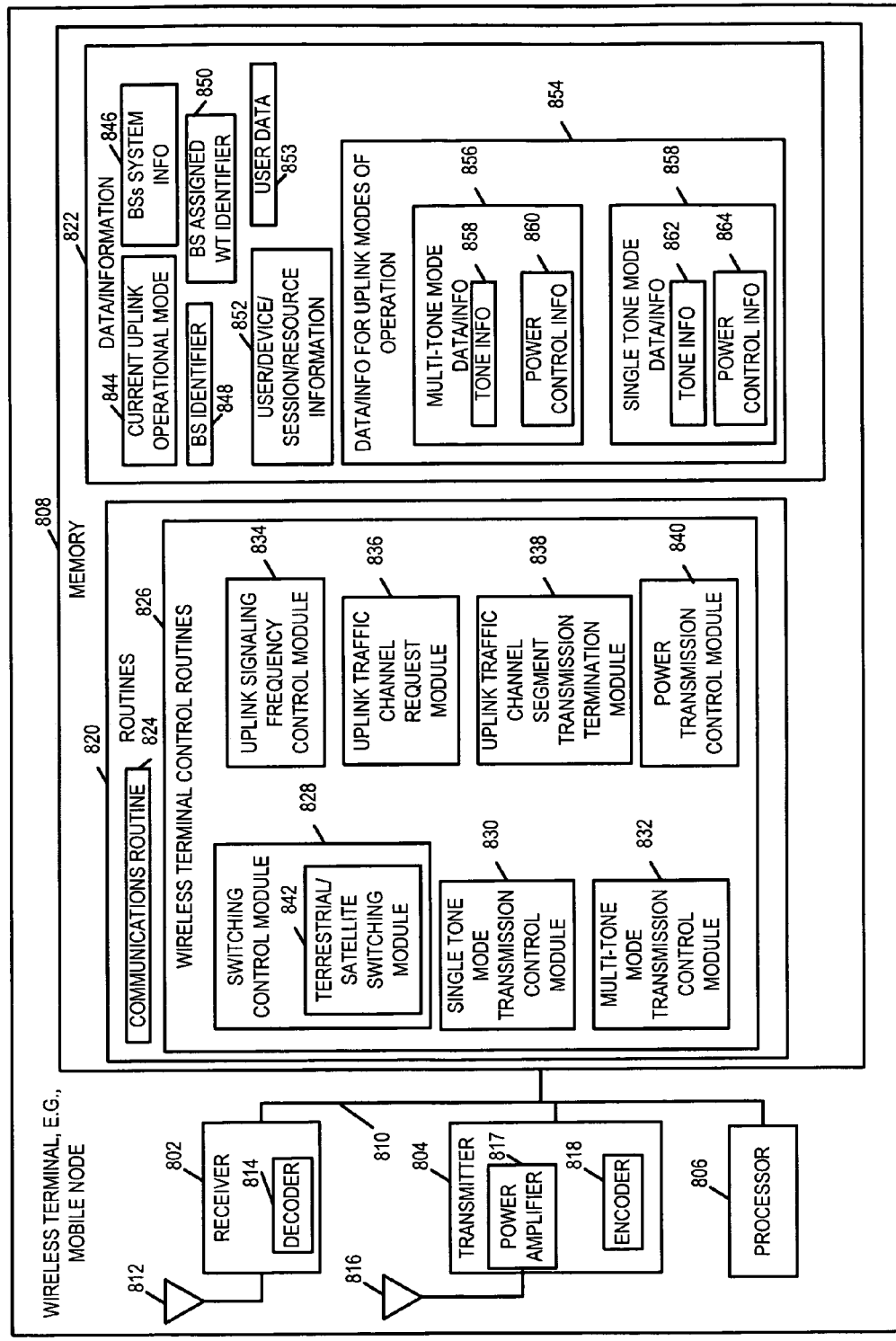
FIG. 8 is a drawing of an exemplary wireless terminal, e.g., mobile node, implemented in accordance with the present invention and using methods of the present invention.

FIG. 8 is a drawing of an exemplary wireless terminal 800, e.g., mobile node, implemented in accordance with the present invention and using methods of the present invention. Exemplary wireless terminal 800 includes a receiver 802, a transmitter 804, a processor 806, and memory 808, coupled together via a bus 810 over which the various elements may interchange data and information.

The receiver 802 is coupled to a receive antenna 812 through which WT 800 receives downlink signals from base stations. Receiver 802 includes a decoder 814 for decoded received downlink signals. Transmitter 804 is coupled to a transmit antenna 816 through which WT 800 transmits uplink signals to base stations. In some embodiments, transmit antenna 816 is an omni-directional antenna. In some embodiments, the same antenna is used for both transmit and receive functions. Transmitter 804 includes a power amplifier 817 and an encoder 818. Power amplifier 817 is controlled in accordance with the present invention to control the transmit power of uplink signaling. Encoder 818 is operated to encode, e.g., via coded blocks, data/information to be communicated in uplink signals to base stations. In some embodiments the coding implementation changes as a function of whether the WT 800 is operating in a single uplink tone mode of operation or a multi-tone uplink mode of operation.

Memory 808 includes routines 820 and data/information 822. The processor 806, e.g., a CPU, executes routines 820 and uses the data/information 822 in memory 808 to control the operation of the WT 800 and implement methods of the present invention.

Routines 820 include a communications routine 824 and wireless terminal control routines 826. Communications routine 824 implements the communications protocols used by the wireless terminal 800. Wireless terminal control routines 826 includes a switching control module 828, a single tone mode transmission control module 830, a multi-tone mode transmission control module 832, an uplink signaling frequency control module 834, an uplink traffic channel request module 836, an uplink traffic channel segment transmission termination module 838, and a power transmission control module 840.

Wireless terminal 800 supports a first multi-tone OFDM uplink mode of operation in which the WT 800 uses multiple OFDM tones at the same time to transmit signals to a base station and a second single tone OFDM uplink mode of operation in which the WT uses a single tone at a time to transmit signals to a base station. Switching control module 828 controls switching between the first multi-tone OFDM uplink mode of operation and the second single tone OFDM mode of operation. For example, switching control module 828 may control operations to transfer control back and forth between single tone transmission control module 830 and multi-tone transmission control module 832. Switching control module 828 includes a terrestrial/satellite switching module 842. Module 842 operations include switching the WT 800 from a multi-tone uplink mode of operation to the single tone uplink mode of operation when the wireless terminal 800 switches from communicating with a terrestrial base station to a satellite base station.

Single tone mode transmission control module 830 controls the transmitter 804 to transmit user data using a single OFDM tone during the single tone uplink mode of operation. Multi-tone mode transmission control module 832 controls the transmitter 804 to transmit user data using multiple OFDM tones at the same time in the multi-tone uplink mode of operation.

Power transmission control module 840 controls the transmitter 804, including control of power amplifier 817, to control the transmission power during the single tone uplink mode of operation to maintain an average peak to average power ratio which is at least 4 dB lower than a peak to average power ratio maintained during the multi-tone uplink mode of operation. Uplink signaling frequency control module 834 reduces the frequency of uplink control signals which are transmitted from the wireless terminal 800 when operation switches from the multi-tone uplink mode of operation to the single tone uplink mode of operation. Uplink traffic channel request module 836 controls the generation and transmission of requests for uplink traffic channel segments during the multi-tone uplink mode of operation, e.g., requests for uplink traffic channel segments that could be assigned to any of a plurality of potential wireless terminals currently coupled to the base station, e.g., a terrestrial base station, and operating in a multi-tone uplink mode of operation. Uplink traffic channel segment transmission termination module 838 controls operations such that the transmitter 804 ceases the transmission of requests for uplink traffic channel segments and/or uplink traffic channel segment signals, e.g., uplink traffic channel segments using multiple tones simultaneously and associated with an assignment corresponding to a request. For example, in some embodiments, when WT 800 is switched to operate in a single tone uplink mode of operation, the WT 800 is assigned a dedicated single tone to use for uplink data/information instead of having to request and be assigned uplink traffic channel segments as is the case in the uplink multi-tone mode of operation, where the uplink traffic channel segments in the uplink multi-tone mode of operation could be assigned to different wireless terminals at different times.

Data/information 822 includes current uplink mode of operation 844, base stations system information 846, BS identifier 848, BS assigned WT identifier 850, user device/session/resource information 852, user data 853, data/information for uplink modes of operation 854. Current uplink operational mode 844 includes the present state of operation of the WT 800 with regard to uplink signaling, e.g., multi-tone uplink mode of operation used with terrestrial base stations or single tone uplink mode of operation used with satellite base stations. BSs system information 846 includes system information corresponding to each of plurality of BSs that WT 800 may use as its point of network attachment. BSs system information 846 may include, e.g., type of base station, e.g., satellite or terrestrial, base station identifier information, base station sector identifier information, carrier frequency used for uplink signaling, tone block used for uplink signaling, tone hopping information used for uplink signals, carrier frequency used for downlink signaling, tone block used for downlink signaling, tone hopping information used for downlink signals, timing and frequency structure information, OFDM symbol timing information including cyclic prefix specifications, grouping of OFDM symbol transmission time intervals, e.g., slots, half-slots, superslots, beaconsslots, ultra sots, etc., access interval information and protocols, etc. BS identifier 848 includes information identifying which BS is being currently used as the WT's point of network attachment, which may be used to correlate with a set of information in BSs system information 846. BS assigned WT identifier 850 may be an identifier assigned to the WT 800 by the BS being used as a point of network attachment. For example, with a satellite BS, the BS identifier 850 may be used to associate with a single dedicated logical tone to be used by the WT 800 for uplink signaling, while with a terrestrial BS, the BS assigned WT identifier 850 may be used by the WT 800 to identify itself when sending requests for traffic channel segments and when processing assignment signals to identify whether an uplink traffic channel segment has been assigned to itself or to some other WT in the system.

User/device/session/resource information 852 includes information about WT 800, e.g., identification information, WT control information, WT option information, an IP address, information about other WTs in a communications session with WT 800, routing information, and information pertaining to allocated air link resources to use. User data 853 includes voice data/information and/or multiplexed packet data/info, e.g., corresponding to video, text, audio, etc. User data 853 may include information bits, code bits, blocks of information bits and blocks of coded bits.

Data/information for uplink modes of operation 854 includes multi-tone mode data/information 856 and single tone mode data/information 858. Multi-tone mode data/information 856 includes tone information 858 and power control information 860, while single tone mode data/information 858 includes tone information 862 and power control information 864.

Figure 9:
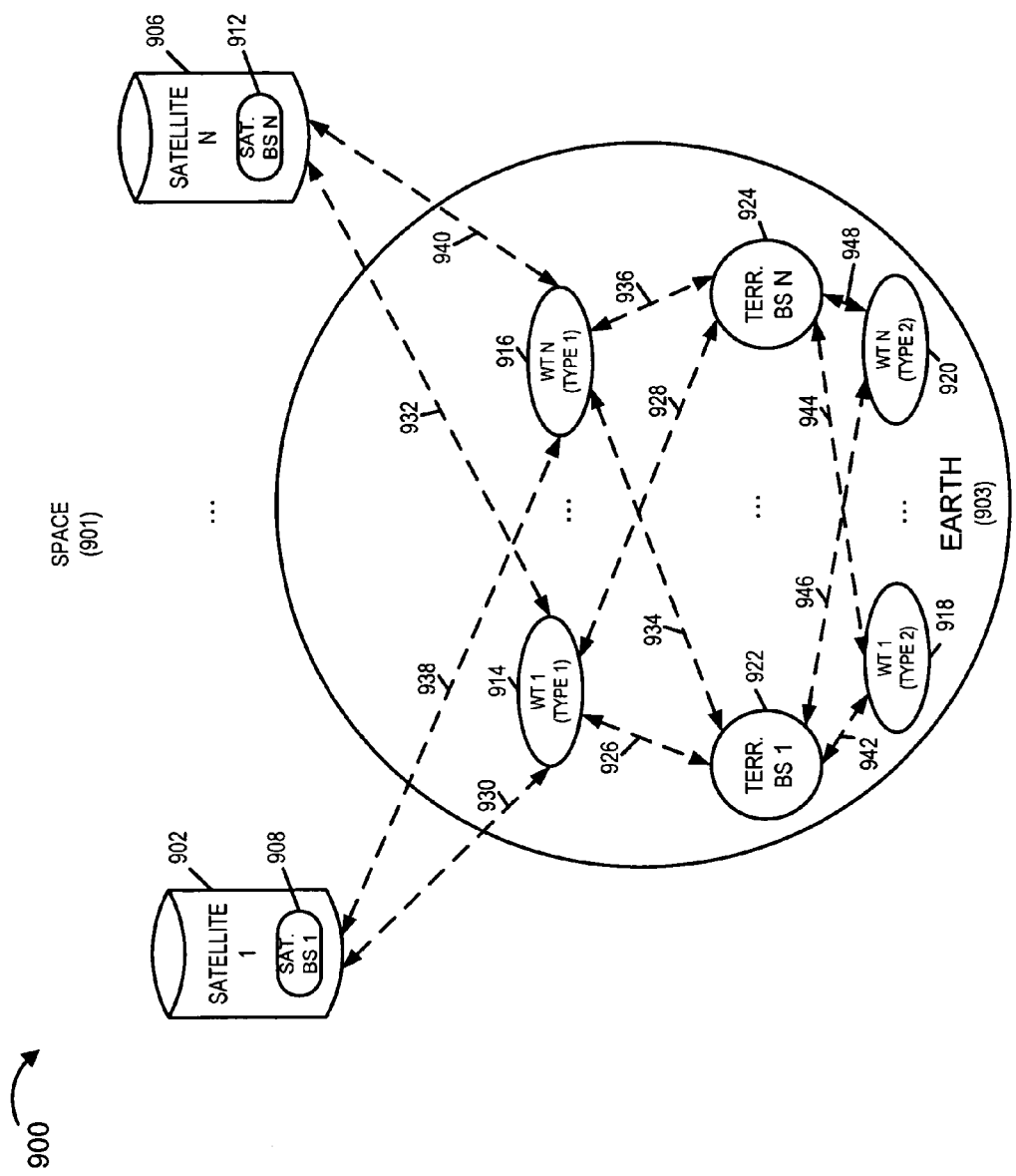
FIG. 9 is drawing of an exemplary OFDM wireless communications system implemented in accordance with the present invention and using methods of the present invention.

FIG. 9 is drawing of an exemplary OFDM wireless communications system 900 implemented in accordance with the present invention and using methods of the present invention. Exemplary OFDM wireless communications system 900 includes a plurality of terrestrial base station (terrestrial base station 1 922, . . . , terrestrial base station N 924) located on earth 903 and a plurality of satellite base stations (satellite BS 1 908 located in satellite 902 in space 901, satellite BS N 912 located in satellite N 906 in space 901). Exemplary OFDM system 900 includes a plurality of first type WTs (WT 1 type 1 914, WT N type 1 916) and a plurality of second type WTs (WT 1 type 2 918, WT N type 2 920). At least some of the WTs (914, 916, 918, 920) are mobile nodes which may move throughout the system and attach to different base stations at different times depending upon location. WTs (914, 916, 918, 920) support both uplink, WT to BS, and downlink, BS to WT, OFDM signaling.

First type WTs (914, 916), transmit uplink signals using a first number of OFDM tones when communicating with a terrestrial base station (922, 924) and transmit uplink signals using a second number of tones when communicating with a satellite base station (908, 912), the second number of tones being smaller than the first number of tones. In some embodiments, the second number of tones is one. In some embodiments, multi-tone refers to multiple tones, e.g., seven, fourteen, or twenty-eight tones being used simultaneously by a WT, to transmit uplink traffic channel segment signals, e.g., including coded user data. In such an exemplary embodiment, additional tones may be used simultaneously to transmit control signals. In some embodiments, although a WT may be in an uplink multi-tone mode of operation, e.g., communicating with a terrestrial BS, and using multiple tones simultaneously for uplink traffic channel signaling of user data, the WT may use a single tone for an access request and a single or multiple tones simultaneously for control signaling with respect to the terrestrial base station.

Second type WTs (918, 920) support a multi-tone uplink mode of operation but do not support a single tone mode of operation, and such WTs can communicate with terrestrial BS 918, 920 but cannot communicate with satellite BS 908, 912.

Dash lines (926, 928, 930, 932) indicate that type 1 WT 1 914 can communicate with (terrestrial BS 1 922, terrestrial BS N 924, satellite BS 1 908, satellite BS N 912) and operate in the (multi-tone, multi-tone, single tone, single tone) uplink mode of operation, respectively, e.g., with the WT 1 914 using different BS (922, 924, 908, 916) as its point of network attachment at different times. Dash lines (934, 936, 938, 940)

indicate that type 1 WT N 916 can communicate with (terrestrial BS 1 922, terrestrial BS N 924, satellite BS 1 908, satellite BS N 912) and operate in the (multi-tone, multi-tone, single tone, single tone) uplink mode of operation, respectively, e.g., with the WT N 916 using different BS (922, 924, 908, 916) as its point of network attachment at different times.

Dash lines (942, 944) indicate that type 2 WT 1 918 can communicate with (terrestrial BS 1 922, terrestrial BS N 924) and operate in the (multi-tone, multi-tone) uplink mode of operation, respectively, e.g., with the WT 1 918 using different BS (922, 924) as its point of network attachment at different times. Dash lines (946, 948) indicate that type 2 WT N 920 can communicate with (terrestrial BS 1 922, terrestrial BS N 924) and operate in the (multi-tone, multi-tone) uplink mode of operation, respectively, e.g., with the WT N 920 using different BS (922, 924) as its point of network attachment at different times.

Figure 10:
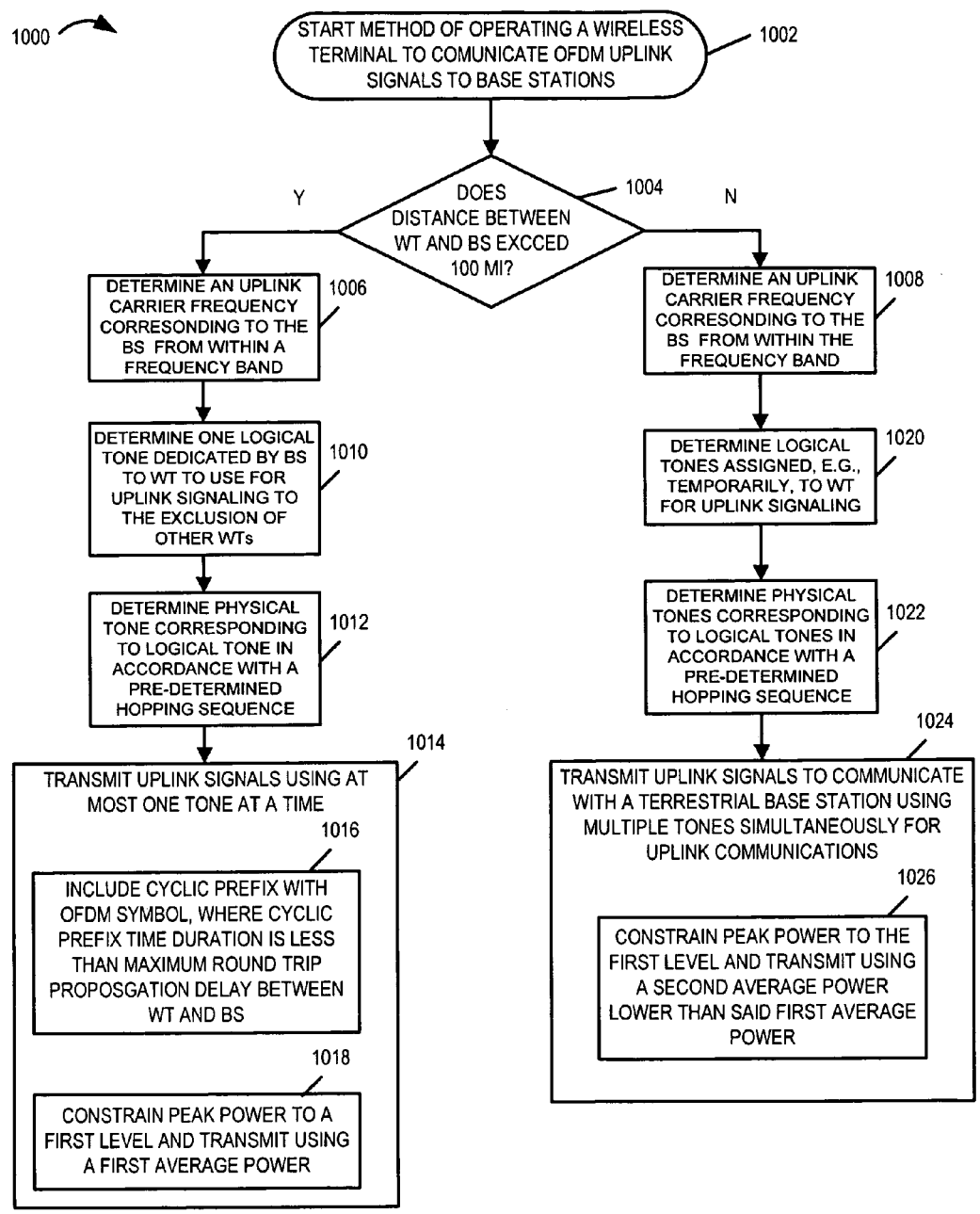
FIG. 10 is a flowchart of an exemplary method of operating a wireless terminal, e.g., mobile node, in accordance with the present invention.

FIG. 10 is a flowchart 1000 of an exemplary method of operating a wireless terminal, e.g., mobile node, in accordance with the present invention. Operation starts in step 1002, where the WT is powered on, initialized and operated to communicate OFDM uplink signals to base stations, e.g., one base station at a time. For example, the wireless terminal may receive a downlink broadcast signal, e.g., a beacon signal or signals from a base station or a plurality of base stations and decide that it wishes to use a particular BS as its point of network attachment. For example, in some embodiments, assuming that a set of at least one terrestrial BS is determined to be acceptable for use as a point of network attachment, the terrestrial BS from the set corresponding to the strongest received beacon signal may be selected by the WT to be used as the attachment point; however, if no terrestrial base stations are available, the WT may then use a satellite base station if the satellite BS is acceptable. Operation proceeds from step 1002 to step 1004.

In step 1004, the wireless terminal determines if the distance between the WT and the base station that it wishes to use as its point of network attachment exceeds 100 mi. In some embodiments, some BSs, e.g., satellite base stations in geostationary orbit, may be known by the WT to be always at least 100 mi away from the WT. In some embodiments, some base stations may be more or less than 100 mi from the WT depending upon WT position, BS position, date and/or time of day.

Assuming that the base station was a base station which was more than 100 mi away from the WT, e.g., a satellite base station, operation proceeds from step 1004 to step 1006; otherwise operation proceeds from step 1004 to step 1008.

In step 1006, the WT determines an uplink carrier frequency corresponding to the base station from within a frequency band, e.g., a carrier frequency and associated tone block within a 1500 MHz frequency band, the band including frequencies in the range of 1500 MHz to 1599 MHz. Operation proceeds from step 1006 to step 1010. In step 1010, the WT is operated to determine one logical tone dedicated by the base station to the WT for the WT to use for uplink signaling to the exclusion of other WTs. Operation proceeds from step 1010 to step 1012. In step 1012, the WT is operated to determine the physical tone corresponding to the logical tone in accordance with a pre-determined hopping sequence. Operation proceeds from step 1012 to step 1014. In step 1014, the wireless terminal is operated to transmit uplink signals using at most one tone at a time. Step 1014 includes operation of sub-step 1016 and sub-step 1018. In sub-step 1016, the WT is operated to include a cyclic prefix with an OFDM symbol, e.g., a cyclic prefix for each OFDM symbol transmitted in the uplink, where a cyclic prefix time duration is less than the maximum round trip propagation delay between the WT and the BS. In sub-step 1018, the WT is operated to constrain the peak power to a first level and transmit using a first average power.

Assuming that the base station was a base station which was 100 mi or less away from the WT, operation proceeds from step 1004 to step 1008. For example, the base station could be a terrestrial base station with a cellular coverage area having a radius of approximately 25 mi, 5 mi, 2 mi, or 1 mi, and the WT could be currently within that coverage area.

In step 1008, the WT determines an uplink carrier frequency corresponding to the base station from within a frequency band, e.g., a carrier frequency and associated tone block within a 1500 MHz frequency band, the band including frequencies in the range of 1500 MHz to 1599 MHz. In some embodiments, the terrestrial base station corresponding to step 1008 and the satellite base station corresponding to step 1006 use the same frequency band, but different non-overlapping carrier frequencies and tone blocks. Operation proceeds from step 1008 to step 1020.

In step 1020, the WT is operated to determine logical tones assigned, e.g., temporarily to a WT for uplink signaling. For example, the WT may have requested an uplink traffic channel segment, and has been assigned temporarily, e.g., for one corresponding iteration in the uplink timing structure an uplink traffic channel segment having a certain index number in the uplink timing structure, the uplink traffic channel segment using multiple, e.g., 7, 14 or 28 tones simultaneously. Operation proceeds from step 1020 to step 1022.

In step 1022 the WT is operated to determine physical tones corresponding to logical tones in accordance with a pre-determined hopping sequence. In some embodiments, the determined uplink tone hopping sequence is a function of a base station identifier value. In some embodiments, the same hopping sequence equation, which is a function of a base station identifier value, is used when determining uplink tone hopping for both single uplink tone operations, e.g., with satellite base stations, and multi-uplink tone operations, e.g., with nearby terrestrial base stations. Operation proceeds from step 1022 to step 1024.

In step 1024 the wireless terminal is operated to transmit uplink signals to communicate with a terrestrial base station using multiple tones simultaneously for uplink communications. The operation of step 1024 includes the operation of sub-step 1026. In sub-step 1026, the wireless terminal is operated to constrain peak power to the first peak power level and to transmit using a second average power, the second average power being lower than the first average power.

Figure 11B:
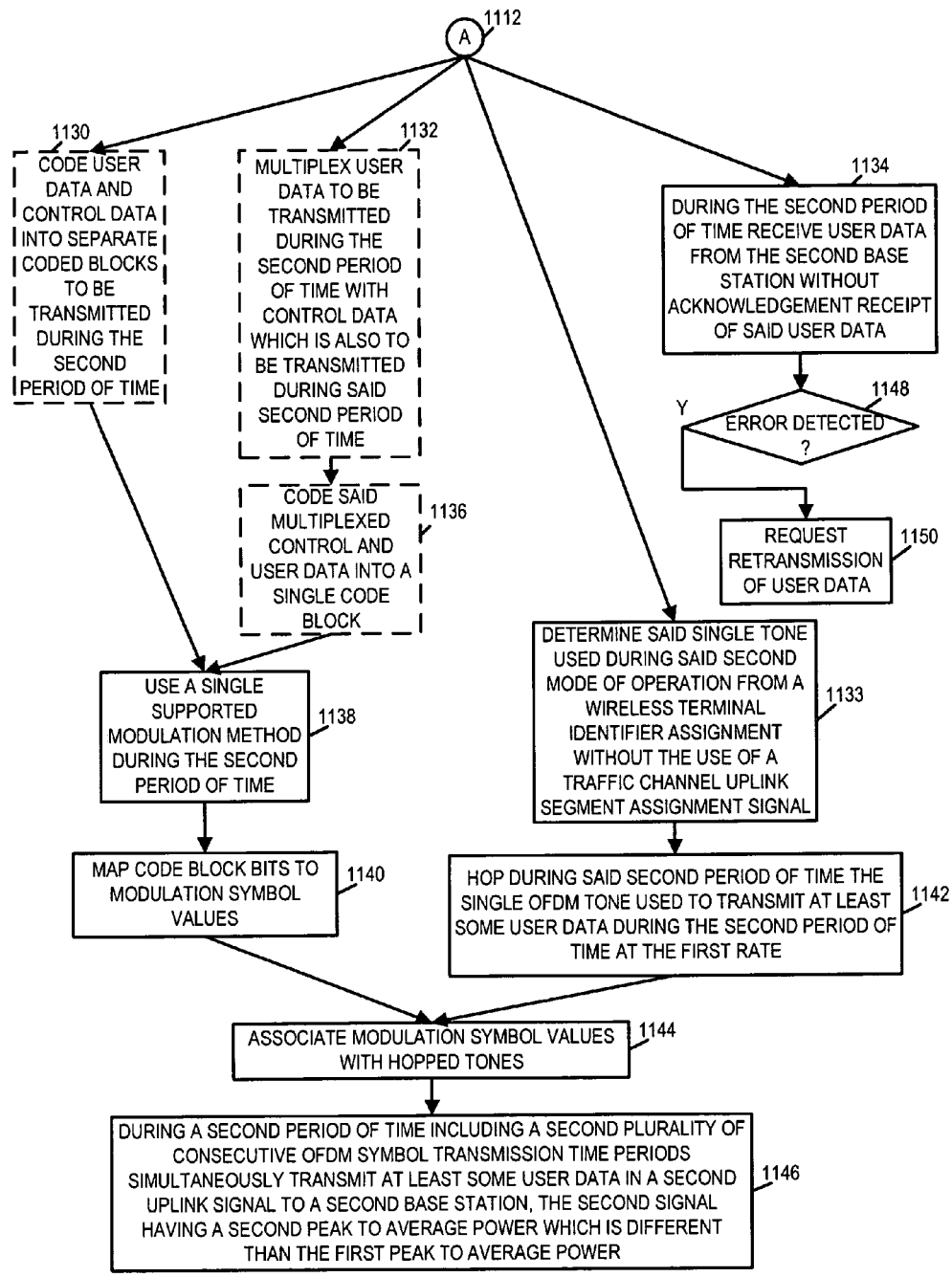
FIG. 11B is a flowchart of an exemplary method of operating a wireless terminal in accordance with the present invention.

FIG. 11 comprising the combination of FIG. 11A and FIG. 11B is a flowchart 1100 of an exemplary method of operating a wireless terminal in accordance with the present invention. The wireless terminal may be, e.g., the exemplary wireless terminal 400 of FIG. 3 or the exemplary wireless terminal 800 of FIG. 8. The exemplary method of operating the wireless terminal, e.g., mobile node, starts in step 1102, where the wireless terminal is powered on and initialized. In step 1102 the wireless terminal may decide to use a particular base station as its point of network attachment, e.g., as part of an initial access following power on, following a change of wireless terminal state such as sleep to active, or as part of a handoff operation between different points of network attachment, e.g., between different base stations. Operational proceeds from step 1102 to step 1104.

In step 1104, the wireless terminal decides which operational uplink mode should be used, a first mode of operation or a second mode of operation. For example, in the first mode of operation, during a first period of time including a first plurality of consecutive OFDM symbol transmission time periods, the wireless terminal is operated to use multiple OFDM tones simultaneously to transmit at least some user data in a first uplink signal to a first base station, the first signal having a first peak to average power ratio; in the second mode of operation, during a second period of time including a second plurality of OFDM symbol transmission time periods the wireless terminal is operated to use at most one OFDM tone to transmit at least some user data in a second signal to a second base station, the second signal having a peak to average power ratio which is different from the first peak power ratio. In some embodiments, the second peak to average power ratio is lower than the first peak to average power ratio, e.g., at least 4 dB lower. In some embodiments, the mode selection is a function of the distance between the base station of interest and the wireless terminal. For example, in some embodiments, the second base station is during said second period of time at least 3 times further away from the wireless terminal than the first base station is during the first period of time. In some embodiments, the second base station is at least a distance away from the wireless terminal during the second period of time such that a signal round trip time between the wireless terminal and base station exceeds a symbol transmission time period, said symbol transmission time period including an amount of time used to transmit one OFDM symbol and a corresponding cyclic prefix. In some embodiments, the first base station is a terrestrial base station and the second base station is a satellite base station. In some embodiments, each of a plurality of potential base stations which the WT may access are identified with an uplink mode of operation. For example terrestrial type base stations may be identified with the first mode of operation, while satellite type base stations may be identified with the second mode of operation.

If the wireless terminal determines that the operational mode should be the first mode operation proceeds from step 1104 to steps 1106, 1108, and 1110. If the wireless terminal determines that the operational mode should be the second mode, operation proceeds to connecting node A 1112.

In step 1106, the WT selects between a plurality of coding rates which can be used to code user data for transmission during a first period of time. In some embodiments, the first base station has selected the uplink coding rate, from among a plurality of coding rates, for the wireless terminal to use and the WT implements the base station selection in step 1106. Then, in step 1114, the WT codes at least some user data to be transmitted during the first period of time in a code block separate from a code block used to communicate control information during the first period of time. Operation proceeds from step 1114 to step 1116. In step 1116, the WT is operated to select one of a plurality of supported modulation methods to be used in transmitting at least some user data during at least a portion if said first period of time. In some embodiments, the first base station selects the modulation method for the wireless terminal to use, from among a plurality of modulation methods and the wireless terminal implements the selection in step 1116. In some embodiments, the WT supports different modulation methods including QAM 4 and QAM 16 in the first uplink mode of operation. Then, in step 1118, the WT is operated to map coded bits to modulation symbol values.

Returning to step 1108, in step 1108 the wireless terminal is operated during said first mode of operation to receive at least one traffic channel uplink segment assignment signal from said first base station. Operation proceeds from step 1108 to step 1120. In step 1120, the WT determines which tones are to be used as some of said multiple OFDM tones during said first period of time from said at least one traffic channel segment assignment signal, e.g., in combination with known timing and frequency structure information corresponding to said first base station. Operation proceeds from step 1120 to step 1122. In step 1122, the wireless terminal is operated to hop during said first period of time the multiple OFDM tones used to simultaneously transmit at least some user data during the first period of time at a first rate. In some embodiments, said first rate is a multiple of a symbol transmission time period, said hopping rate resulting in the same physical tones being used for a plurality of consecutive symbol transmission time periods in said first time period, e.g., seven consecutive symbol transmission time periods.

Operation proceeds from steps 1118 and 1122 to step 1124. In step 1124, the wireless terminal is operated to associate modulation symbol values from step 1118 with hopped tones from step 1122. Operation proceeds from step 1124 to step 1126. In step 1126, during the first period of time including a plurality of consecutive OFDM symbol transmission time periods the wireless terminal is operated to simultaneously transmit at least some user data in a first uplink signal to the first base station, the first uplink signal having a first peak to average power. In some embodiments, transmitting at least some user data during said first period of time includes transmitting user data at a rate of at least 4.8 Kbits/sec. In some embodiments, during the first mode of operation, the wireless terminal uses at least one tone having a fixed one to one association with a base station assigned wireless terminal identifier assigned by said first base station for transmission of control signals to said first base station.

Returning to step 1110, during step 1110, the wireless terminal is operated during said first period of time to receive user data from said first base station. Operation proceeds from step 1110 to step 1128. In step 1128, the wireless terminal is operated to transmit acknowledgements to the first base station according to a first predetermined acknowledgement scheme.

In step 1104, if the WT determined that the operation uplink mode should be the second mode then operation proceeds via connecting node A 1112 to step 1130 or 1132, step 1133, and step 1134. In step 1130, the WT codes user data and control data into separate coded blocks to be transmitted during the second period of time. Following the alternative path, in step 1132, the wireless terminal multiplexes user data to be transmitted during the second period of time with control data which is also to be transmitted during the second period of time. Operation proceeds from step 1132 to step 1136. In step 1136, the wireless terminal codes the multiplexed control and user data of step 1132 into a single code block.

In some embodiments, the wireless terminal codes data at single coding rate for transmission during the second period of time, the single coding rate being equal to or lower than the lowest coding rate in said plurality of coding rates which can be used to code user data for transmission during said first period of time.

Operation proceeds from either step 1130 or step 1136 to step 1138. In step 1138, the wireless terminal uses a single supported modulation method, e.g., QPSK, during the second period of time. Operation proceeds from step 1138 to step 1140. In step 1140, the wireless terminal is operated to map code block bits to modulation symbol values.

In step 1133, the wireless terminal is operated to determine the single tone used during said second mode of operation from a wireless terminal identifier assignment without the use of a traffic channel uplink segment assignment signal. For example, when a wireless terminal registers with the second base station, e.g., a satellite base station, the wireless terminal may be assigned an active user identifier value, and each active user identifier value may be associated with a different logical uplink tone in the uplink timing and frequency structure used by the base station. In some embodiments, the single tone used during said second mode of operation occupies a position in a logical uplink transmission timing structure which is dedicated during the first mode of operation to a dedicated control channel used during said first period of time exclusively for control signaling. In some embodiments the single tone used during the second mode of operation has a fixed one to one association with a base station assigned wireless terminal identifier, while during the first mode of operation, said tones used to transmit user data do not have a fixed one to one association with a base station assigned wireless terminal identifier. Operation proceeds from step 1133 to step 1142. In step 1142, the wireless terminal is operated to hop during the second period of time the single OFDM tone used to transmit at least some user data during the second period of time at the first rate. In some embodiments, said first rate is a multiple of a symbol transmission time period, said hopping rate resulting in the same physical tones being used for a plurality of consecutive symbol transmission time periods in said second time period, e.g., seven consecutive symbol transmission time periods.

Operation proceeds from step 1140 and step 1142 to step 1144. In step 1144 the wireless terminal is operated to associate modulation symbol values with hopped tones. Operation proceeds from step 1144 to step 1146. In step 1146, the wireless terminal is operated during the second period of time including a second plurality of consecutive OFDM symbol transmission time periods to simultaneously transmit at least some user data in a second uplink signal to the second base station, the second signal having a second peak to average power which is different than the first peak to average power. In some embodiments, transmitting at least some user data during said second period of time includes transmitter user data at a rate of at least 4.8 Kbits/sec. In some embodiments, e.g., some embodiments where user data and control data are coded into separate blocks in the second mode of operation, the single tone is allowed to go unused and no signal is transmitted on said single tone during periods of time dedicated to the transmission of user data when there is no user data to be transmitted. In some embodiments, the step of transmitting during said first period of time 1126 and the step of transmitting during the second period of time 1146 include using an omni-directional antenna to transmit signals to first and second base stations.

Returning to step 1134, in step 1134, the wireless terminal is operated during the second period of time to receive user data from the second base station without acknowledgement of said user data. Operation proceeds from step 1134 to step 1148. In step 1148, the wireless terminal is operated to check if there was an error detected in the received downlink user data of step 1134. If an error was detected, operation proceeds to step 1150 where the wireless terminal is operated to request retransmission of user data. In some embodiments, the decision as to whether or not to perform step 1150 is further qualified, e.g., by the importance of the data, the level of service of the wireless terminal, and/or time staleness consideration of the data.

The techniques of the present invention may be implemented using software, hardware and/or a combination of software and hardware. The present invention is directed to apparatus, e.g., mobile nodes such as mobile terminals, base stations, communications system which implement the present invention. It is also directed to methods, e.g., method of controlling and/or operating mobile nodes, base stations and/or communications systems, e.g., hosts, in accordance with the present invention. The present invention is also directed to machine readable medium, e.g., ROM, RAM, CDs, hard discs, etc., which include machine readable instructions for controlling a machine to implement one or more steps in accordance with the present invention.

In various embodiments nodes described herein are implemented using one or more modules to perform the steps corresponding to one or more methods of the present invention, for example, signal processing, message generation and/or transmission steps. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

While described in the context of an OFDM system, at least some of the methods and apparatus of the present invention, are applicable to a wide range of communications systems including many non-OFDM and/or non-cellular systems.

Numerous additional variations on the methods and apparatus of the present invention described above will be apparent to those skilled in the art in view of the above description of the invention. Such variations are to be considered within the scope of the invention. In some embodiments the base stations server as access nodes which establish communications links with mobile nodes (WTs) using OFDM signals. In various embodiments the WTs are implemented as cell phones, notebook computers, personal data assistants (PDAs), or other portable devices including receiver/transmitter circuits and logic and/or routines, for implementing the methods of the present invention.

What is claimed is:

1. A method of operating a wireless terminal, comprising:
    during a first period of time including a first plurality of consecutive OFDM symbol transmission time periods, operating in a first mode of operation during which multiple OFDM tones are used simultaneously to transmit at least some user data in a first uplink signal to a first base station, the first signal having a first peak to average power ratio;
    during a second period of time, including a second plurality of consecutive OFDM symbol transmission time periods, operating in a second mode of operation during which at most one OFDM tone is used to transmit at least some user data in a second signal to a second base station, the second signal having a second peak to average power ratio which is different from said first peak to average power ratio, wherein said second peak to average power ratio is lower than said first peak to average power ratio;
    receiving user data from the first base station during said first period of time;
    transmitting acknowledgements to the first base station according to a first predetermined acknowledgement scheme; and receiving user data from the second base station during said second period of time without acknowledging receipt of said user data.

2. The method of claim 1, further comprising:
during said second period of time, requesting retransmission of user data in response to detection of an error in the received user data.

3. A method of operating a wireless terminal, comprising:
during a first period of time including a first plurality of consecutive OFDM symbol transmission time periods, operating in a first mode of operation during which multiple OFDM tones are used simultaneously to transmit at least some user data in a first uplink signal to a first base station, the first signal having a first peak to average power ratio;
during a second period of time, including a second plurality of consecutive OFDM symbol transmission time periods, operating in a second mode of operation during which at most one OFDM tone is used to transmit at least some user data in a second signal to a second base station, the second signal having a second peak to average power ratio which is different from said first peak to average power ratio, wherein said second peak to average power ratio is lower than said first peak to average power ratio;
during said first mode of operation, prior to transmission of said user data during said first period of time, coding at least some of said user data to be transmitted during said first period of time in a code block separate from a code block used to communicate control information during said first period of time;
during said second mode of operation, prior to transmission of said user data during said second period of time, multiplexing the user data to be transmitted during said second period of time with control data which is also to be transmitted during said second period of time; and
coding said multiplexed control and user data in a single code block.

4. A method of operating a wireless terminal, comprising:
during a first period of time including a first plurality of consecutive OFDM symbol transmission time periods, operating in a first mode of operation during which multiple OFDM tones are used simultaneously to transmit at least some user data in a first uplink signal to a first base station, the first signal having a first peak to average power ratio;
during a second period of time, including a second plurality of consecutive OFDM symbol transmission time periods, operating in a second mode of operation during which at most one OFDM tone is used to transmit at least some user data in a second signal to a second base station, the second signal having a second peak to average power ratio which is different from said first peak to average power ratio;
wherein during said second period of time the second basxe station is at least 3 times further away from the wireless terminal than the first base station is from the wireless terminal during said first period of time; and
wherein said single tone used during said second mode of operation occupies a position in a logical uplink transmission timing structure which is dedicated during said first mode of operation to a dedicated control channel used during said first period of time exclusively for control signaling.

5. A method of operating a wireless terminal, comprising:
during a first period of time including a first plurality of consecutive OFDM symbol transmission time periods, operating in a first mode of operation during which multiple OFDM tones are used simultaneously to transmit at least some user data in a first uplink signal to a first base station, the first signal having a first peak to average power ratio;
during a second period of time, including a second plurality of consecutive OFDM symbol transmission time periods, operating in a second mode of operation during which at most one OFDM tone is used to transmit at least some user data in a second signal to a second base station, the second signal having a second peak to average power ratio which is different from said first peak to average power ratio;
wherein during said second period of time the second base station is at least 3 times further away from the wireless terminal than the first base station is from the wireless terminal during said first period of time; and
wherein said single tone used during said second mode of operation has a fixed one to one association with a base station assigned wireless terminal identifier; and
wherein during said first mode of operation, said tones used to transmit user data do not have a fixed one to one association with a base station assigned wireless terminal identifier.

6. The method of claim 3, wherein during said first mode of operation, said wireless terminal uses at least one tone having a fixed one to one association with a base station assigned wireless terminal identifier assigned by said first base station for transmission of control signals to said first base station.

7. The method of claim 6, further comprising:
during said first mode of operation, receiving at least one traffic channel uplink segment assignment signal from said first base station;
determining which tones are to be used as some of said multiple OFDM tones used during said first period of time from said at least one traffic channel uplink segment assignment signal; and
determining said single tone used during said second mode of operation from a wireless terminal identifier assignment, without the use of a traffic channel uplink segment assignment signal.

8. A method of operating a wireless terminal, comprising:
during a first period of time including a first plurality of consecutive OFDM symbol transmission time periods, operating in a first mode of operation during which multiple OFDM tones are used simultaneously to transmit at least some user data in a first uplink signal to a first base station, the first signal having a first peak to average power ratio;
during a second period of time, including a second plurality of consecutive OFDM symbol transmission time periods, operating in a second mode of operation during which at most one OFDM tone is used to transmit at least some user data in a second signal to a second base station, the second signal having a second peak to average power ratio which is different from said first peak to average power ratio;
coding user data and control data into separate coded blocks during said second period of time; and
using the same single tone used to transmit coded blocks of user data to transmit coded blocks of control data 9. The method of claim 8, wherein during said second mode of operation, said single tone is allowed to go unused and no signal is transmitted on said single tone during periods of time dedicated to the transmission of user data when there is no user data to be transmitted.

10. A method of operating a wireless terminal, comprising:
during a first period of time including a first plurality of consecutive OFDM symbol transmission time periods, operating in a first mode of operation during which multiple OFDM tones are used simultaneously to transmit at least some user data in a first uplink signal to a first base station, the first signal having a first peak to average power ratio;
during a second period of time, including a second plurality of consecutive OFDM symbol transmission time periods, operating in a second mode of operation during which at most one OFDM tone is used to transmit at least some user data in a second signal to a second base station, the second signal having a second peak to average power ratio which is different from said first peak to average power ratio;
selecting one of a plurality of supported different modulation methods to be used in transmitting said at least some user data during at least a portion of said first period of time; and
using a single supported modulation method during said second period of time.

11. The method of claim 10, wherein said supported different modulation methods include QAM 4 and QAM 16 modulation and wherein said single supported modulation method is a QPSK modulation method.

12. The method of claim 11, further comprising:
selecting between a plurality of coding rates which can be used to code user data for transmission during said first period of time;
and coding data at a single coding rate for transmission during said second period of time, the single coding rate being equal to or lower than the lowest coding rate in said plurality of coding rates which can be used to code user data for transmission during said first period of time.

13. An OFDM communications method, the method comprising:
operating a wireless terminal in a first, multi-tone OFDM uplink mode of operation, in which the wireless terminal uses multiple OFDM tones at the same time to transmit signals to a first base station;
operating a wireless terminal in a second, single tone OFDM uplink mode of operation, in which the wireless terminal uses a single OFDM tone to transmit signals to a second base station, said second base station having a minimum possible physical distance from said wireless terminal which is greater than the minimum possible physical distance which can occur between said wireless terminal and said first base station, where said second base station is a satellite base station and said first base station is a terrestrial base station;
switching from the first mode of operation to the second mode of operation when a handoff occurs from said first base station to said second base station; and
wherein switching between the first and second modes of operation includes ceasing to send acknowledgements in response to received user data.

14. An OFDM communications method, the method comprising:
operating a wireless terminal in a first, multi-tone OFDM uplink mode of operation, in which the wireless terminal uses multiple OFDM tones at the same time to transmit signals to a first base station;
operating a wireless terminal in a second, single tone OFDM uplink mode of operation, in which the wireless terminal uses a single OFDM tone to transmit signals to a second base station, said second base station having a minimum possible physical distance from said wireless terminal which is greater than the minimum possible physical distance which can occur between said wireless terminal and said first base station, where said second base station is a satellite base station and said first base station is a terrestrial base station;
switching from the first mode of operation to the second mode of operation when a handoff occurs from said first base station to said second base station; and
wherein switching between the first and second modes of operation includes reducing the frequency of uplink control signals which are transmitted from the wireless terminal.

15. The OFDM communications method of claim 14, wherein switching between the first and second modes of operation includes ceasing to transmit requests for traffic channel segment assignments.

16. A communications method, comprising:
operating a wireless terminal to transmit OFDM signals to a first base station, where the distance between the wireless terminal and base station exceeds 100 miles; and
wherein a cyclic prefix transmitted with an OFDM symbol to the base station has a duration which is less than the maximum round trip propagation delay between the wireless terminal and the base station;
wherein the wireless terminal transmits to said base station using at most 1 tone at a time; and
wherein said at most one tone is a logical tone dedicated to said wireless terminal by said base station for use in uplink signaling to the exclusion of use by other wireless terminals.

17. The method of claim 16, wherein said one logical tone corresponds to a physical tone which is determined over time according to a predetermined hopping sequence.

18. A communications method, comprising:
operating a wireless terminal to transmit OFDM signals to a first base station, where the distance between the wireless terminal and base station exceeds 100 miles; and
wherein a cyclic prefix transmitted with an OFDM symbol to the base station has a duration which is less than the maximum round trip propagation delay between the wireless terminal and the base station;
operating the wireless terminal to communicate with a terrestrial base station using multiple OFDM tones simultaneously for uplink communications to the terrestrial base station; and
using the same peak power constraint used for transmitting to the first base station for transmitting to the terrestrial base station but using a higher average power for transmitting signals to the first base station than is used for transmitting signals to the terrestrial base station.

19. The method of claim 18, wherein the first base station is a satellite base station, the method further comprising:
using the same frequency band for communications to the satellite base station and the terrestrial base station but different non-overlapping carrier frequencies for the terrestrial and satellite base stations.

20. The method of claim 19, wherein said same frequency band is a 1500 MHz frequency band, the band including frequencies in the range of 1500 to 1599 MHz.

21. A wireless communications terminal comprising:
control means for controlling switching between a first multi-tone OFDM uplink mode of operation in which the wireless terminal uses multiple OFDM tones at the same time to transmit signals to a base station, and a second single tone OFDM uplink mode of operation;

means for transmitting user data using a single OFDM tone during said single tone uplink mode of operation;

means for transmitting user data using multiple OFDM tones at the same time in said multi-tone uplink mode of operation;

wherein said control means includes means for switching from multi-tone uplink mode of operation to said single tone uplink mode of operation when said wireless terminal switches from communicating with a terrestrial base station to a satellite base station; and means for reducing the frequency of uplink control signals which are transmitted from the wireless terminal when operation switches from said multi-tone uplink mode of operation to said single tone uplink mode of operation.

22. The wireless terminal of claim 21, wherein the wireless terminal includes an omni-directional antenna coupled to said means for transmitting user data using a single OFDM tone during said single tone uplink mode of operation.

23. The wireless terminal of claim 21,
wherein said user data includes at least some voice or text data; and
wherein the wireless terminal further includes:
means for transmitting requests for uplink traffic channel segments during said multi-tone uplink mode of operation; and
means for ceasing the transmission of uplink traffic channel segments when said mode of operation is switched from said multi-tone mode of operation to said single tone mode of operation.

24. An OFDM communications system, the system comprising:
a plurality of terrestrial base stations;
at least one satellite base station;
a wireless terminal of a first type which transmits uplink signals using a first number of OFDM tones when communicating with a terrestrial base station and transmits uplink signals using a second number of tones when communicating with a satellite base station, the second number of tones being smaller than said first number of tones; and
a plurality of wireless terminals of a second type which only support a multi-tone uplink mode of operation.

25. The OFDM communications system of claim 24, further comprising additional wireless terminals of said first type and wherein said wireless terminals of said second type are limited to being able to communicate with terrestrial base stations while wireless terminals of the first type can communicate with both terrestrial base stations and satellite base stations using OFDM signals in both the uplink and downlink.

26. A wireless terminal, comprising:
a multi-tone mode transmission control module for controlling transmission during a first period of time including a first plurality of consecutive OFDM symbol transmission time periods in which said wireless terminal operates in a first mode of operation, said transmission during said first mode of operation being controlled to use multiple OFDM tones simultaneously to transmit at least some user data in a first uplink signal to a first base station, the first signal having a first peak to average power ratio;
a single-tone mode transmission control module for controlling transmission during a second period of time including a second plurality of consecutive OFDM symbol transmission time periods in which said wireless terminal operates in a second mode of operation during which at most one OFDM tone is used to transmit at least some user data in a second signal to a second base station, the second signal having a second peak to average power ratio which is different from said first peak to average power ratio, wherein said second peak to average power ratio is lower than said first peak to average power ratio;
a receiver module for receiving user data from the first base station during said first period of time;
a communications module for acknowledging receipt of user data, received during said first period of time from the first base station, in accordance with a first predetermined acknowledgement scheme and for allowing user data from the second base station received during said second period of time to go unacknowledged.

27. The wireless terminal of claim 26, further comprising:
a switching control module for controlling switching between said first and second modes of operation, said switching control means controlling said wireless terminal to switch to said second mode of operation for satellite communications.

28. A wireless terminal, comprising:
multi-tone mode transmission control means for controlling transmission during a first period of time including a first plurality of consecutive OFDM symbol transmission time periods in which said wireless terminal operates in a first mode of operation, said transmission during said first mode of operation being controlled to use multiple OFDM tones simultaneously to transmit at least some user data in a first uplink signal to a first base station, the first signal having a first peak to average power ratio;
single-tone mode transmission control means for controlling transmission during a second period of time including a second plurality of consecutive OFDM symbol transmission time periods in which said wireless terminal operates in a second mode of operation during which at most one OFDM tone is used to transmit at least some user data in a second signal to a second base station, the second signal having a second peak to average power ratio which is different from said first peak to average power ratio, wherein said second peak to average power ratio is lower than said first peak to average power ratio;
receiver means for receiving user data from the first base station during said first period of time;
communications means for acknowledging receipt of user data, received during said first period of time from the first base station, in accordance with a first predetermined acknowledgement scheme and for allowing user data from the second base station received during said second period of time to go unacknowledged.

29. The wireless terminal of claim 28, further comprising:
switching control means for controlling switching between said first and second modes of operation, said switching control means controlling said wireless terminal to switch to said second mode of operation for satellite communications.

30. A computer readable medium embodying machine executable instructions for controlling a communications device to implement a method, the method comprising:
during a first period of time including a first plurality of consecutive OFDM symbol transmission time periods, operating in a first mode of operation during which multiple OFDM tones are used simultaneously to transmit at least some user data in a first uplink signal to a first base station, the first signal having a first peak to average power ratio;

during a second period of time, including a second plurality of consecutive OFDM symbol transmission time periods, operating in a second mode of operation during which at most one OFDM tone is used to transmit at least some user data in a second signal to a second base station, the second signal having a second peak to average power ratio which is different from said first peak to average power ratio, wherein said second peak to average power ratio is lower than said first peak to average power ratio;

receiving user data from the first base station during said first period of time;

transmitting acknowledgements to the first base station according to a first predetermined acknowledgement scheme; and receiving user data from the second base station during said second period of time without acknowledging receipt of said user data.

31. A wireless terminal, comprising:

multi-tone mode transmission control means for controlling transmission during a first period of time including a first plurality of consecutive OFDM symbol transmission time periods in which said wireless terminal operates in a first mode of operation, said transmission during said first mode of operation being controlled to use multiple OFDM tones simultaneously to transmit at least some user data in a first uplink signal to a first base station, the first signal having a first peak to average power ratio;

single-tone mode transmission control means for controlling transmission during a second period of time including a second plurality of consecutive OFDM symbol transmission time periods in which said wireless terminal operates in a second mode of operation during which at most one OFDM tone is used to transmit at least some user data in a second signal to a second base station, the second signal having a second peak to average power ratio which is different from said first peak to average tower ratio, wherein said second peak to average power ratio is lower than said first peak to average power ratio;

coding means for coding user data and control data into separate coded blocks during said second period of time; and transmission means for transmitting coded blocks of control data using the same single tone used to transmit coded blocks of user data.

32. A wireless terminal, comprising:

a multi-tone mode transmission control module for controlling transmission during a first period of time including a first plurality of consecutive OFDM symbol transmission time periods in which said wireless terminal operates in a first mode of operation, said transmission during said first mode of operation being controlled to use multiple OFDM tones simultaneously to transmit at least some user data in a first uplink signal to a first base station, the first signal having a first peak to average power ratio;

a single-tone mode transmission control module for controlling transmission during a second period of time including a second plurality of consecutive OFDM symbol transmission time periods in which said wireless terminal operates in a second mode of operation during which at most one OFDM tone is used to transmit at least some user data in a second signal to a second base station, the second signal having a second peak to average power ratio which is different from said first peak to average power ratio, wherein said second peak to average power ratio is lower than said first peak to average power ratio;

a coding module for coding user data and control data into separate coded blocks during said second period of time; and an antenna for transmitting coded blocks of control data using the same single tone used to transmit coded blocks of user data.

33. A computer readable medium embodying machine executable instructions for controlling a communications device to implement a method, the method comprising:

during a first period of time including a first plurality of consecutive OFDM symbol transmission time periods, operating in a first mode of operation during which multiple OFDM tones are used simultaneously to transmit at least some user data in a first uplink signal to a first base station, the first signal having a first peak to average power ratio;

during a second period of time, including a second plurality of consecutive OFDM symbol transmission time periods, operating in a second mode of operation during which at most one OFDM tone is used to transmit at least some user data in a second signal to a second base station, the second signal having a second peak to average power ratio which is different from said first peak to average power ratio;

coding user data and control data into separate coded blocks during said second period of time; and using the same single tone used to transmit coded blocks of user data to transmit coded blocks of control data.

34. A wireless terminal, comprising:

a multi-tone mode transmission control module for controlling transmission during a first period of time including a first plurality of consecutive OFDM symbol transmission time periods in which said wireless terminal operates in a first mode of operation, said transmission during said first mode of operation being controlled to use multiple OFDM tones simultaneously to transmit at least some user data in a first upJ.ink signal to a first base station, the first signal having a first peak to average power ratio;

a single-tone mode transmission control module for controlling transmission during a second period of time including a second plurality of consecutive OFDM symbol transmission time periods in which said wireless terminal operates in a second mode of operation during which at most one OFDM tone is used to transmit at least some user data in a second signal to a second base station, the second signal having a second peak to average power ratio which is different from said first peak to average power ratio, wherein said second peak to average power ratio is lower than said first peak to average power ratio;

a communications module for selecting one of a plurality of supported different modulation methods to be used in transmitting said at least some user data during at least a portion of said first period of time; and a transmitter for transmitting user data modulated using a single modulation method supported during said second period of time.

35. The wireless terminal of claim 34, wherein said supported different modulation methods include QAIVI 4 and QAM 16 modulation and wherein said single supported modulation method is a QPSK modulation method.

36. A wireless terminal, comprising:
multi-tone mode transmission control means for controlling transmission during a first period of time including a first plurality of consecutive OFDM symbol transmission time periods in which said wireless terminal operates in a first mode of operation, said transmission during said first mode of operation being controlled to use multiple OFDM tones simultaneously to transmit at least some user data in a first uplink signal to a first base station, the first signal having a first peak to average power ratio;
single-tone mode transmission control means for controlling transmission during a second period of time including a second plurality of consecutive OFDM symbol transmission time periods in which said wireless terminal operates in a second mode of operation during which at most one OFDM tone is used to transmit at least some user data in a second signal to a second base station, the second signal having a second peak to average power ratio which is different from said first peak to average power ratio, wherein said second peak to average power ratio is lower than said first peak to average power ratio;
communications means for selecting one of a plurality of supported different modulation methods to be used in transmitting said at least some user data during at least a portion of said first period of time; and
transmitter means for transmitting user data modulated using a single modulation method supported during said second period of time.

37. The wireless terminal of claim 36, wherein said supported different modulation methods include QAM 4 and QAN 16 modulation and wherein said single supported modulation method is a QPSK modulation method.

38. A computer readable medium embodying machine executable instructions for controlling a communications device to implement a method, the method comprising:
during a first period of time including a first plurality of consecutive OFDM symbol transmission time periods, operating in a first mode of operation during which multiple OFDM tones are used simultaneously to transmit at least some user data in a first uplink signal to a first base station, the first signal having a first peak to average power ratio;
during a second period of time, including a second plurality of consecutive OFDM symbol transmission time periods, operating in a second mode of operation during which at most one OFDM tone is used to transmit at least some user data in a second signal to a second base station, the second signal having a second peak to average power ratio which is different from said first peak to average power ratio;
selecting one of a plurality of supported different modulation methods to be used in transmitting said at least some user data during at least a portion of said first period of time; and
using a single supported modulation method during said second period of time.

39. A wireless terminal comprising:
a multi-tone mode transmission control module for controlling transmission, during a first multi-tone OFDM uplink mode of operation, to use multiple OFDM tones at the same time to transmit signals to a first base station;
a single-tone mode transmission control module for controlling transmission, during a single tone OFDM uplink mode of operation, to use a single OFDM tone to transmit signals to a second base station, said second base station having a minimum possible physical distance from said wireless terminal which is greater than the minimum possible physical distance which can occur between said wireless terminal and said first base station, where said second base station is a satellite base station and said first base station is a terrestrial base station; and
a switching control module for controlling switching from the first mode of operation to the second mode of operation when a handoff occurs from said first base station to said second base station and to control the wireless terminal to cease sending acknowledgements in response to received user data as part of switching from the first mode to the second mode of operation.

40. A wireless terminal comprising:
multi-tone mode transmission control means for controlling transmission, during a first multi-tone OFDM uplink mode of operation, to use multiple OFDM tones at the same time to transmit signals to a first base station;
single-tone mode transmission control means for controlling transmission, during a single tone OFDM uplink mode of operation, to use a single OFDM tone to transmit signals to a second base station, said second base station having a minimum possible physical distance from said wireless terminal which is greater than the minimum possible physical distance. which can occur between said wireless terminal and said first base station, where said second base station is a satellite base station and said first base station is a terrestrial base station; and
switching control means for controlling switching from the first mode of operation to the second mode of operation when a handoff occurs from said first base station to said second base station and to control the wireless terminal to cease sending acknowledgements in response to received user data as part of switching from the first mode to the second mode of operation.

41. A computer readable medium embodying machine executable instructions for controlling a wireless terminal to implement a method, the method comprising:
operating a wireless terminal in a first, multi-tone OFDM uplink mode of operation, in which the wireless terminal uses multiple OFDM tones at the.same time to transmit signals to a first base station;
operating a wireless terminal in a second, single tone OFDM uplink mode of operation, in which the wireless terminal uses a single OFDM tone to transmit signals to a second base station, said second base station having a minimum possible physical distance from said wireless terminal which is greater than the minimum possible physical distance which can occur between said wireless terminal and said first base station, where said second base station is a satellite base station and said first base station is a terrestrial base station;
switching from the first mode of operation to the second mode of operation when a handoff occurs from said first base station to said second base station; and
wherein switching between the first and second modes of operation includes ceasing to send acknowledgements in response to received user data.

42. A wireless communications terminal comprising:
a switching control module for controlling switching between a first multi-tone OFDM uplink mode of operation in which the wireless terminal uses multiple OFDM tones at the same time to transmit signals to a base station, and a second single tone OFDM uplink mode of operation;

a transmitter for transmitting user data using a single OFDM tone during said single tone uplink mode of operation and for transmitting user data using multiple OFDM tones at the same time in said multi-tone uplink mode of operation;

wherein said control module switches from multi-tone uplink mode of operation to said single tone uplink mode of operation when said wireless terminal switches from communicating with a terrestrial base station to a satellite base station; and an uplink signaling frequency control module for reducing the frequency of uplink control signals which are transmitted from the wireless terminal when operation switches from said multi-tone uplink mode of operation to said single tone uplink mode of operation.

43. A computer readable medium embodying machine executable instructions for controlling a wireless terminal to implement a method, the method comprising:

operating the wireless terminal in a first, multi-tone OFDM uplink mode of operation, in which the wireless terminal uses multiple OFDM tones at the same time to transmit signals to a first base station;

operating a wireless terminal in a second, single tone OFDM uplink mode of operation, in which the wireless terminal uses a single OFDM tone to transmit signals to a second base station, said second base station having a minimum possible physical distance from said wireless terminal which is greater than the minimum possible physical distance which can occur between said wireless terminal and said first base station, where said second base station is a satellite base station and said first base station is a terrestrial base station;

switching from the first mode of operation to the second mode of operation when a handoff occurs from said first base station to said second base station; and wherein switching between the first and second modes of operation includes reducing the frequency of uplink control signals which are transmitted from the wireless terminal.

44. A device comprising:

a processor configured to control a wireless terminal to implement a communications method, the method comprising:

during a first period of time including a first plurality of consecutive OFDM symbol transmission time periods, operating in a first mode of operation during which multiple OFDM tones are used simultaneously to transmit at least some user data in a first uplink signal to a first base station, the first signal having a first peak to average power ratio;

during a second period of time, including a second plurality of consecutive OFDM symbol transmission time periods, operating in a second mode of operation during which at most one OFDM tone is used to transmit at least some user data in a second signal to a second base station, the second signal having a second peak to average power ratio which is different from said first peak to average power ratio, wherein said second peak to average power ratio is lower than said first peak to average power ratio;

receiving user data from the first base station during said first period of time;

transmitting acknowledgements to the first base station according to a first predetermined acknowledgement scheme; and receiving user data from the second base station during said second period of time without acknowledging receipt of said user data.

45. A device comprising: a processor configured to control a wireless terminal to implement a communications method, the method comprising:

during a first period of time including a first plurality of consecutive OFDM symbol transmission time periods, operating in a first mode of operation during which multiple OFDM tones are used simultaneously to transmit at least some user data in a first uplink signal to a first base station, the first signal having a first peak to average power ratio;

during a second period of time, including a second plurality of consecutive OFDM symbol transmission time periods, operating in a second mode of operation during which at most one OFDM tone is used to transmit at least some user data in a second signal to a second base station, the second signal having a second peak to average power ratio which is different from said first peak to average power ratio, wherein said second peak to average power ratio is lower than said first peak to average power ratio;

during said first mode of operation, prior to transmission of said user data during said first period of time, coding at least some of said user data to be transmitted during said first period of time in a code block separate from a code block used to communicate control information during said first period of time;

during said, second mode of operation, prior to transmission of said user data during said second period of time, multiplexing the user data to be transmitted during said second period of time with control data which is also to be transmitted during said second period of time; and coding said multiplexed control and user data in a single code block.

46. A device comprising:

a processor configured to control a wireless terminal to implement a communications method, the method comprising:

during a first period of time including a first plurality of consecutive OFDM symbol transmission time periods, operating in a first mode of operation during which multiple OFDM tones are used simultaneously to transmit at least some user data in a first uplink signal to a first base station, the first signal having a first peak to average power ratio;

during a second period of time, including a second plurality of consecutive OFDM symbol transmission time periods, operating in a second mode of operation during which at most one OFDM tone is used to transmit at least some user data in a second signal to a second base station, the second signal having a second peak to average power ratio which is different from said first peak to average power ratio; and wherein during said second period of time the second base station is at least 3 times further away from the wireless terminal than the first base station is from the wireless terminal during said first period of time; and wherein said single tone used during said second mode of operation occupies a position in a logical uplink transmission timing structure which is dedicated during said first mode of operation to a dedicated control channel used during said first period of time exclusively for control signaling.

47. A device comprising:

a processor configured to control a wireless terminal 3 to:

during a first period of time including a first plurality of consecutive OFDM symbol transmission time periods, operate in a first mode of operation during which multiple OFDM tones are used simultaneously to transmit at least some user data in a first uplink signal to a first base station, the first signal having a firstpeak to average power ratio;

during a second period of time, including a second plurality of consecutive OFDM symbol transmission time periods, operate in a second mode of operation during which at most one oFDM tone is used to transmit at least some user data in a second signal to a second base station, the second signal having a second peak to average power ratio which is different from said first peak to average power ratio;

wherein during said second period of time the second base station is at least 3 times further away from the wireless terminal than the first base station is from the wireless terminal during said first period of time; and wherein said single tone used during said second mode of operation has a fixed one to one association with a base station assigned wireless terminal identifier; and wherein during said first mode of operation, said tones used to transmit user data do not have a fixed one to one association with a base station assigned wireless terminal identifier.

48. A device comprising:

a processor configured to control a wireless terminal to:

during a first period of time including a first plurality of consecutive OFDM symbol transmission time periods, operate in a first mode of operation during which multiple OFDM tones are used simultaneously to transmit at least some user data in a first uplink signal to a first base station, the first signal having a first peak to average power ratio;

during a second period of time, including a second plurality of consecutive OFDM symbol transmission time periods, operate in a second mode of operation during which at most one OFDM tone is used to transmit at least some user data in a second signal to a second base station, the second signal having a second peak to average power ratio which is different from said first peak to average power ratio;

encode user data and control data into separate coded blocks during said second period of time; and use the same single tone used to transmit coded blocks of user data to transmit coded blocks of control data.

49. A device comprising:

a processor configured to control a wireless terminal to implement a communications method, the method comprising:

during a first period of time including a first plurality of consecutive OFDM symbol transmission time periods, operate in a first mode of operation during which multiple OFDM tones are used simultaneously to transmit at least some user data in a first uplink signal to a first base station, the first signal having a first peak to average power ratio;

during a second period of time, including a second plurality of consecutive OFDM symbol transmission time periods, operate in a second mode of operation during which at most one OFDM tone is used to transmit at least some user data in a second signal to a second base station, the second signal having a second peak to average power ratio which is different from said first peak to average power ratio;

select one of a plurality of supported different modulation methods to be used in transmitting said at least some user data during at least a portion of said first period of time; and use a single supported modulation method during said second period of time.

50. A device comprising a processor configured to implement an OFDM communications method, the method comprising:

controlling a wireless terminal in a first, multi-tone OFDM uplink mode of operation, in which the wireless terminal uses multiple OFDM tones at the same time to transmit signals to a first base station;

controlling the wireless terminal in a second, single tone OFDM uplink mode of operation, in which the wireless terminal uses a single OFDM tone to transmit signals to a second base station, said second base station having a minimum possible physical distance from said wireless terminal which is greater than the minimum possible physical distance which can occur between said wireless terminal and said first base station, where said second base station is a satellite base station and said first base station isa terrestrial base station;

switching from the first mode of operation to the second mode of operation when a handoff occurs from said first base station to said second base station; and wherein switching between the first and second modes of operation includes ceasing to send acknowledgements in response to received user data.

51. A device comprising:

a processor configured to implement an OFDM communications method, the method comprising:

controlling a wireless terminal in a first, multi-tone OFDM uplink mode of operation, in which the wireless terminal uses multiple OFDM tones at the same time to transmit signals to a first base station;

controlling the wireless terminal in a second, single tone OFDM uplink mode of operation, in which the wireless terminal uses a single OFDM tone to transmit signals to a second base station, said second base station having a minimum possible physical distance from said wireless terminal which is greater than the minimum possible physical distance which can occur between said wireless terminal and said first base station, where said second base station is a satellite base station and said first base station is a terrestrial base station;

switching from the first mode of operation to the second mode of operation when a handoff occurs from said first base station to said second base station; and wherein switching between the first and second modes of operation includes reducing the frequency of uplink control signals which are transmitted from the wireless terminal.

52. A device comprising:

a processor configured to implement a communications method, the method comprising:

operating a wireless terminal to transmit OFDM signals to a first base station, where the distance between the wireless terminal and base station exceeds 100 miles;

wherein a cyclic prefix transmitted with an OFDM symbol to the base station has a duration which is less than the maximum round trip propagation delay between the wireless terminal and the base station;

wherein the wireless terminal transmits to said base station using at most 1 tone at a time; and wherein said at most one tone is a logical tone dedicated to said wireless terminal by said base station for use in uplink signaling to the exclusion of use by other wireless terminals.

53. A device comprising:

a processor configured to implement a communications method, the method comprising:

operating a wireless terminal to transmit OFDM signals to a first base station, where the distance between the wireless terminal and base station exceeds 100 miles; and wherein a cyclic prefix transmitted with an OFDM symbol to the base station has a duration which is less than the maximum round trip propagation delay between the wireless terminal and the base station;

operating the wireless terminal to communicate with a terrestrial base station using multiple OFDM tones simultaneously for. uplink communications to the terrestrial base station; and using the same peak power constraint used for transmitting to the first base station for transmitting to the terrestrial base station but using a higher average power for transmitting signals to the first base station than is used for transmitting signals to the terrestrial base station.

* * * * *